Figure 43:
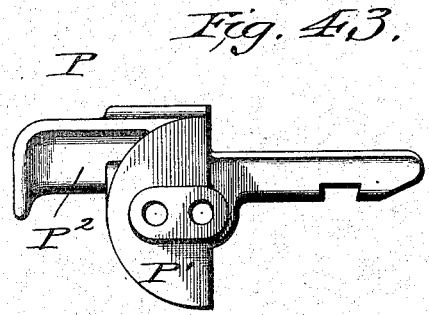

(No Model.) 12 Sheets—Sheet 1.
L. V. BENÉT & H. A. MERCIÉ.
AUTOMATIC MACHINE GUN.
No. 564,043. Patented July 14, 1896.
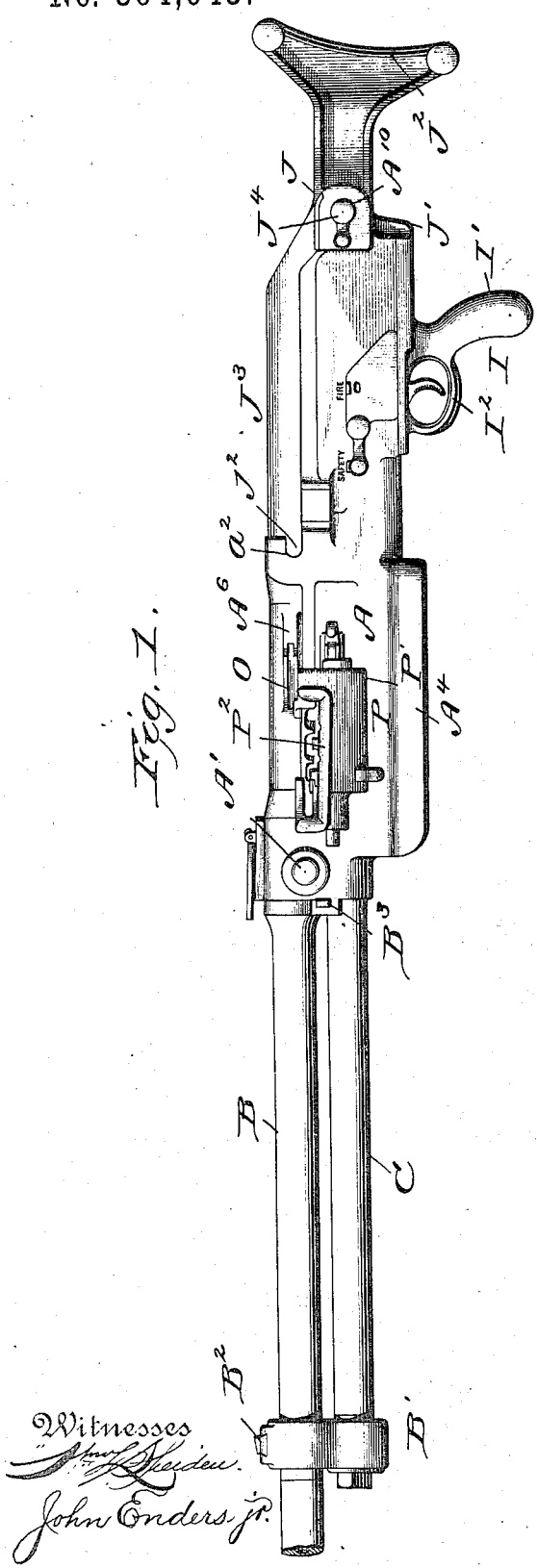
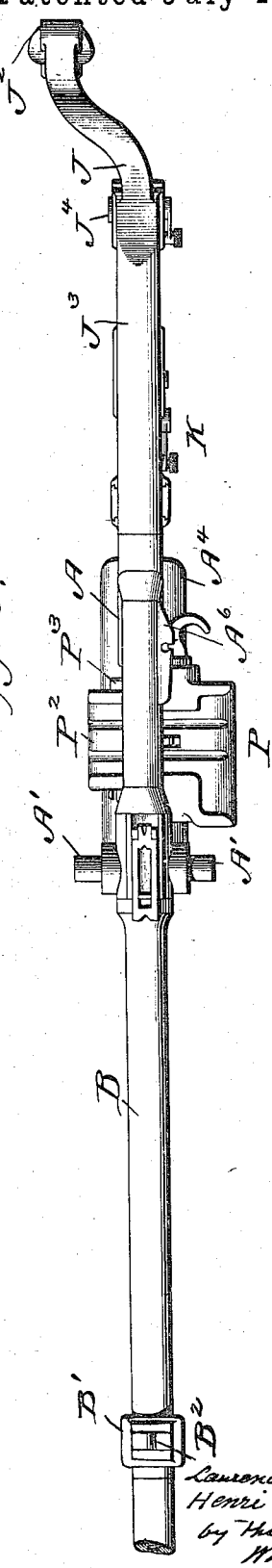

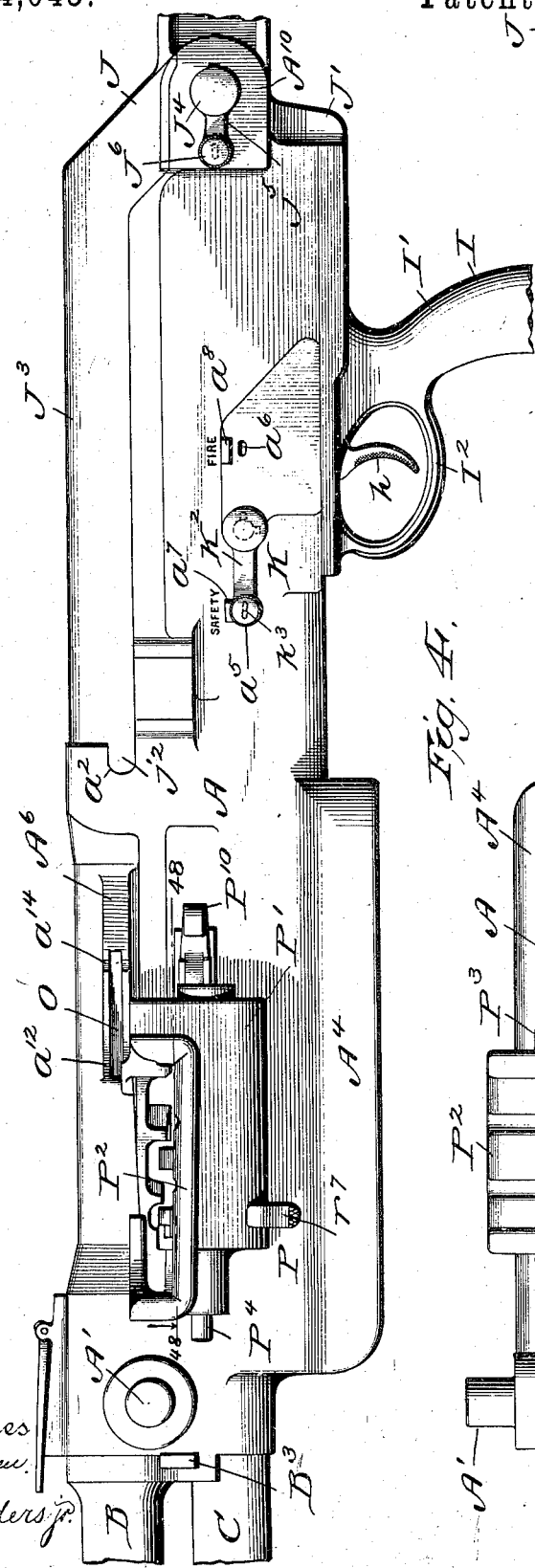

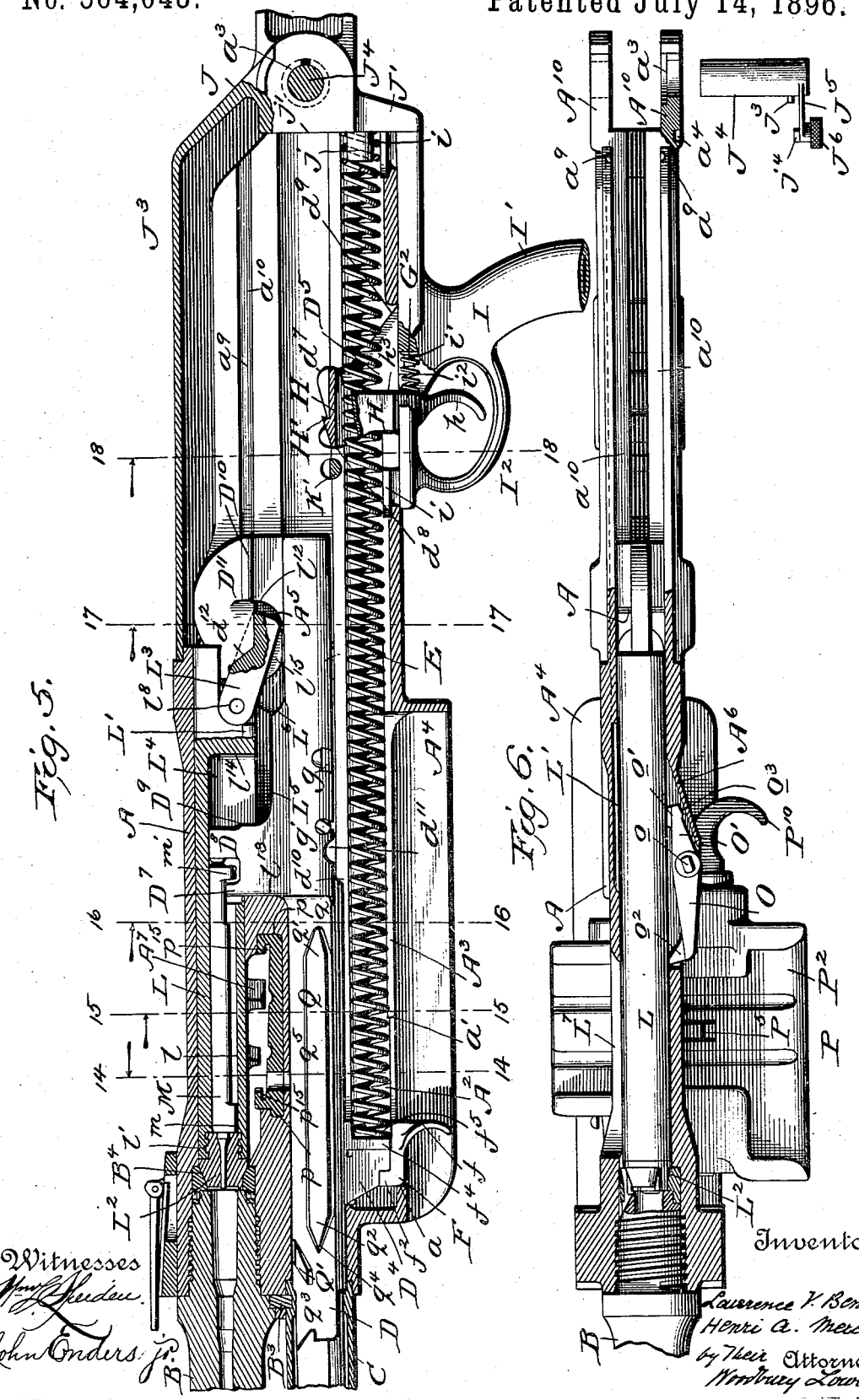

(No Model.) 12 Sheets—Sheet 4.
L. V. BENÉT & H. A. MERCIÉ.
AUTOMATIC MACHINE GUN.
No. 564,043. Patented July 14, 1896.
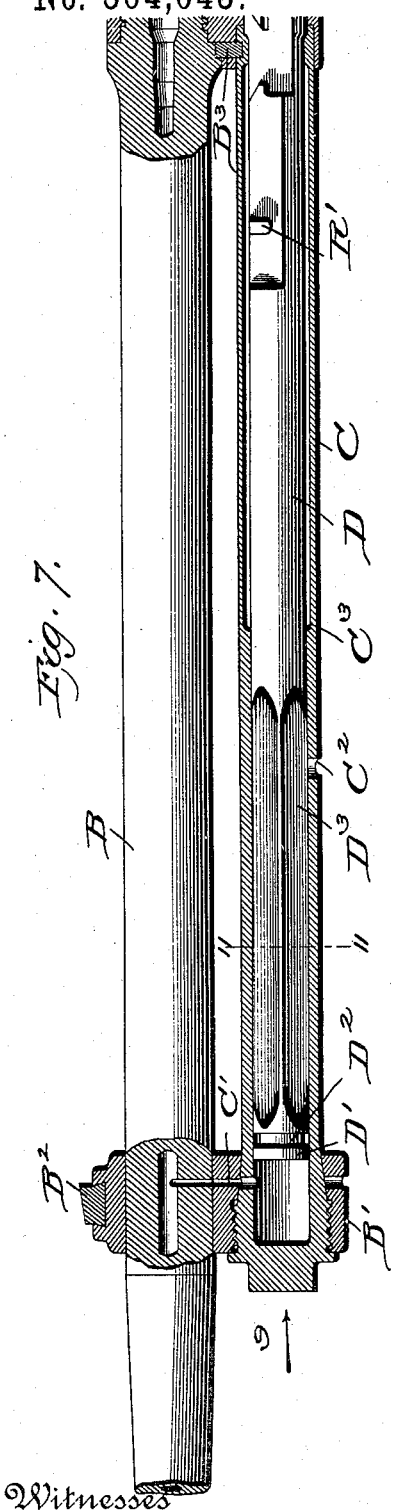
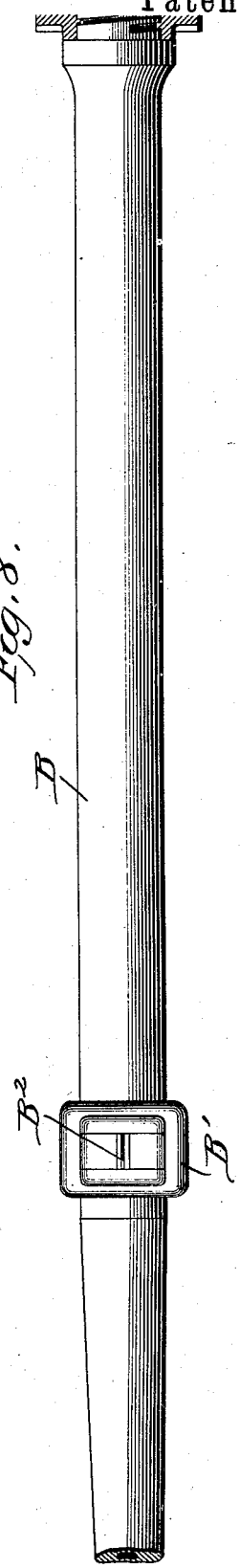
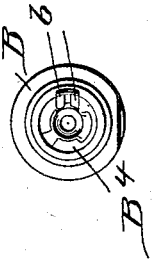
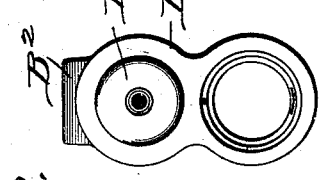
Witnesses
Inventors
Laurence V. Benét,
Henri A. Mercié
by their Attorney
Woodbury Lowery.

(No Model.) 12 Sheets—Sheet 5.
L. V. BENÉT & H. A. MERCIÉ.
AUTOMATIC MACHINE GUN.
No. 564,043. Patented July 14, 1896.
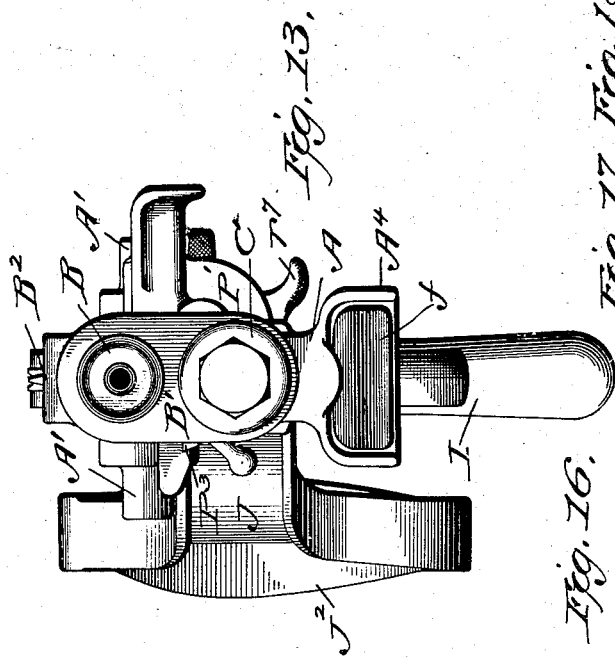
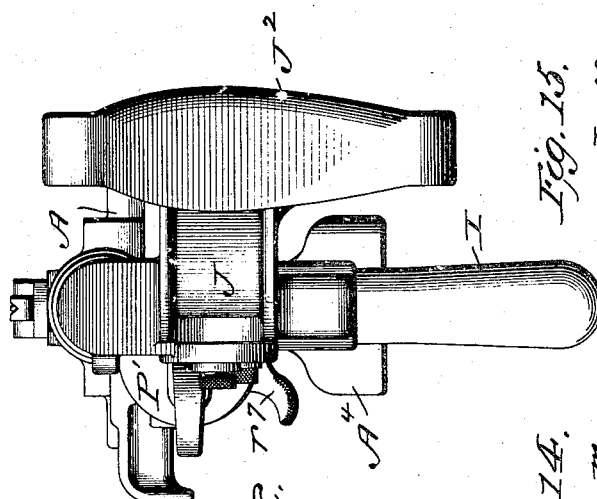
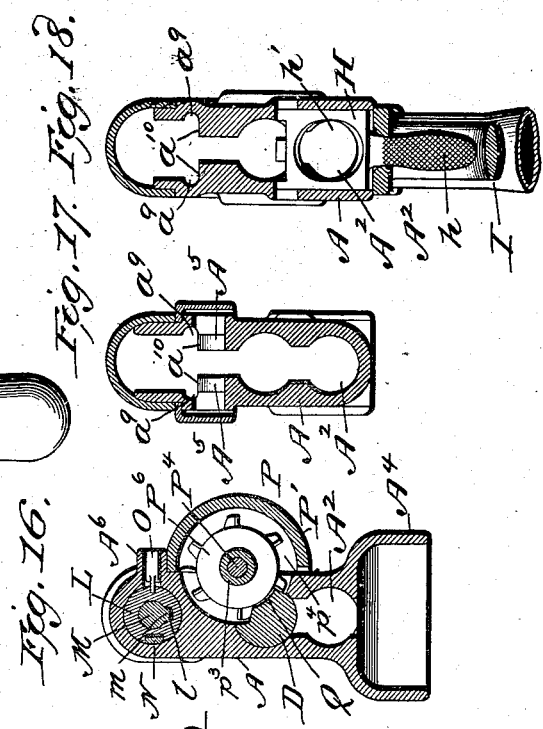
Witnesses
Inventors
Laurence V. Benét
Henri A. Mercié
by their Attorney
Woodbury Lowery

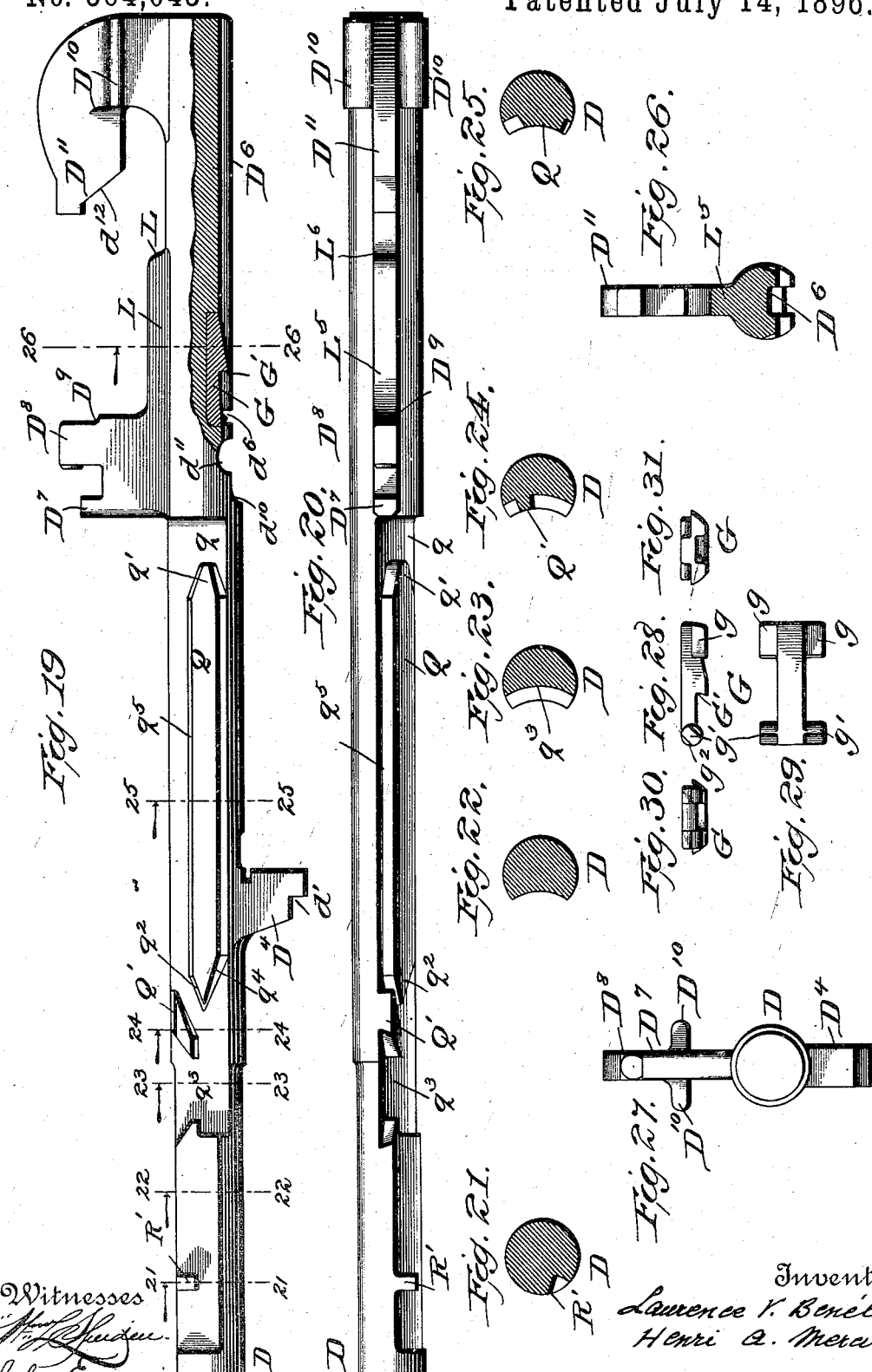

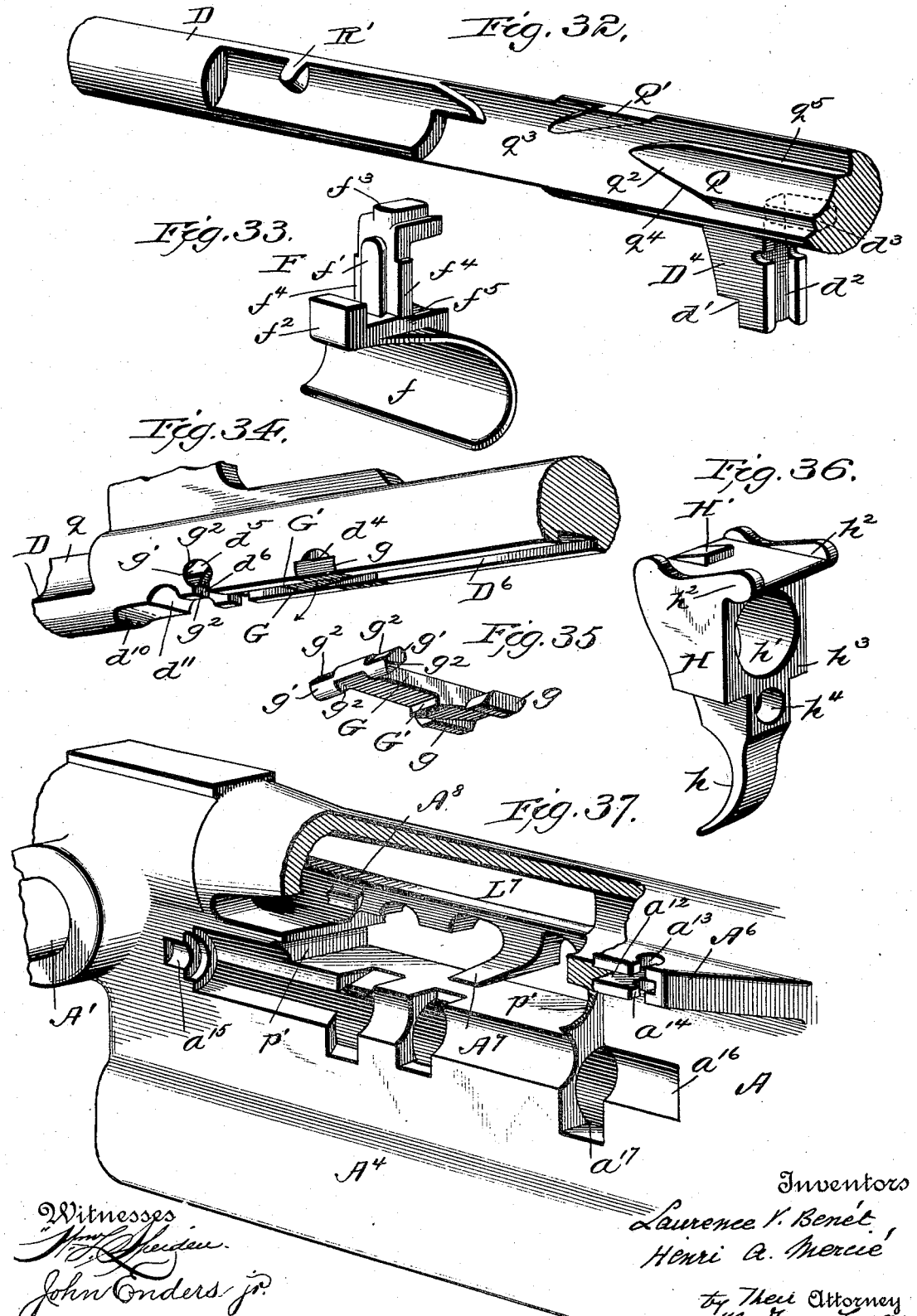

(No Model.) 12 Sheets—Sheet 8.
L. V. BENÉT & H. A. MERCIÉ.
AUTOMATIC MACHINE GUN.
No. 564,043. Patented July 14, 1896.
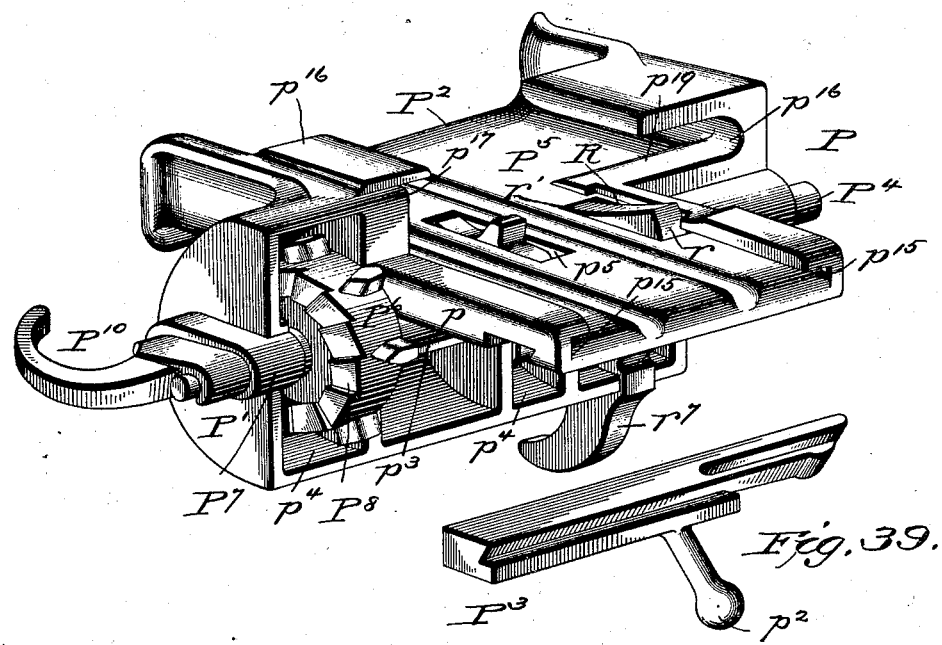
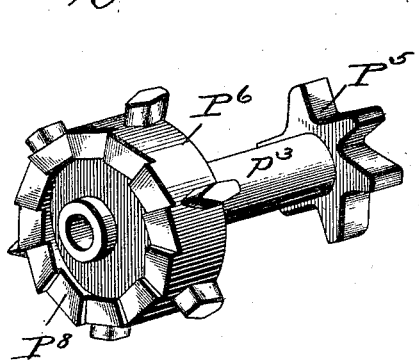
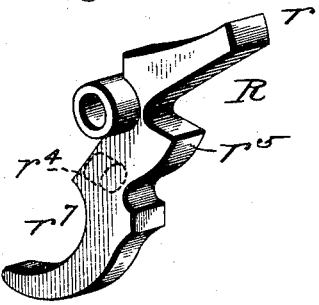
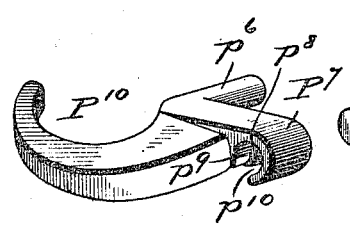
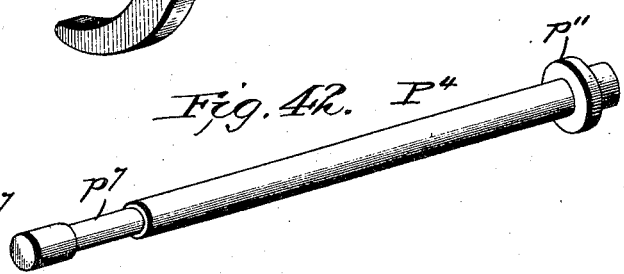
Witnesses
Inventors
Laurence V. Benét
Henri A. Mercié
by Woodbury Lowery
Attorney (No Model.) 12 Sheets—Sheet 9.

L. V. BENÉT & H. A. MERCIÉ.
AUTOMATIC MACHINE GUN.

No. 564,043. Patented July 14, 1896.

Witnesses
Inventors
Laurence V. Benét
Henri A. Mercié
by Woodbury Lowery
Attorney (No Model.) 12 Sheets—Sheet 10.
L. V. BENÉT & H. A. MERCIÉ.
AUTOMATIC MACHINE GUN.
No. 564,043. Patented July 14, 1896.
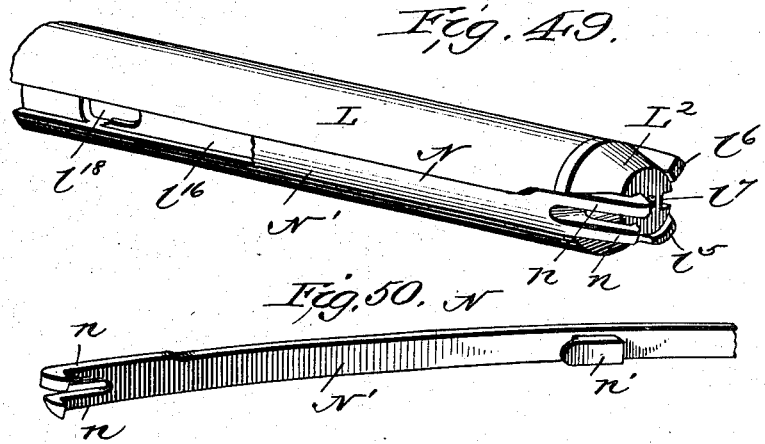
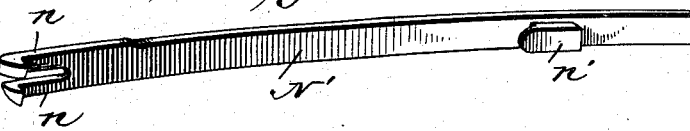
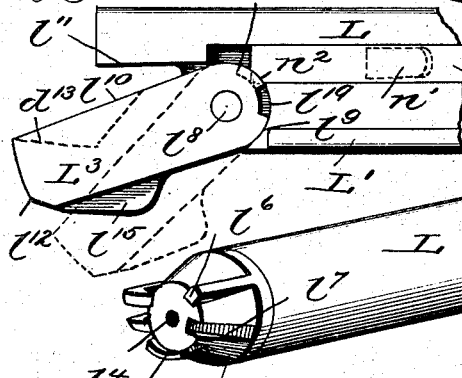
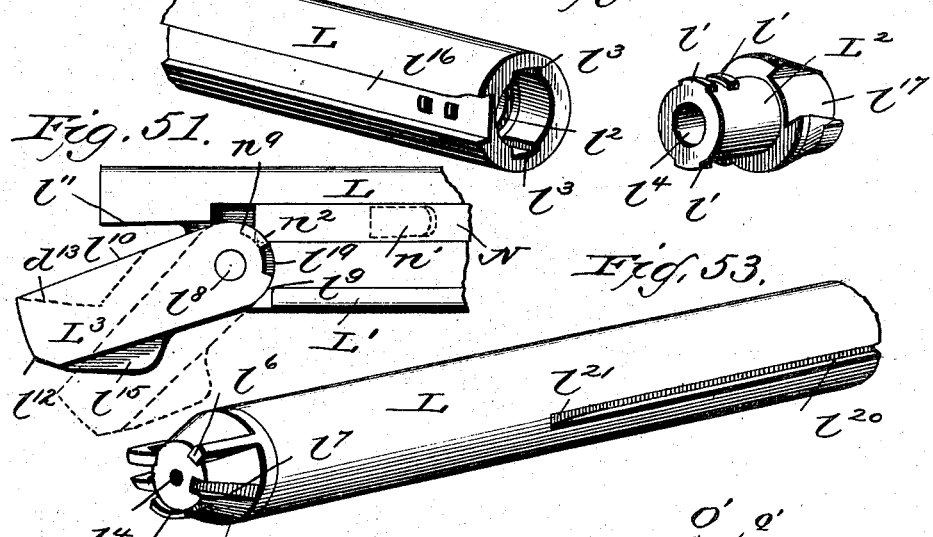
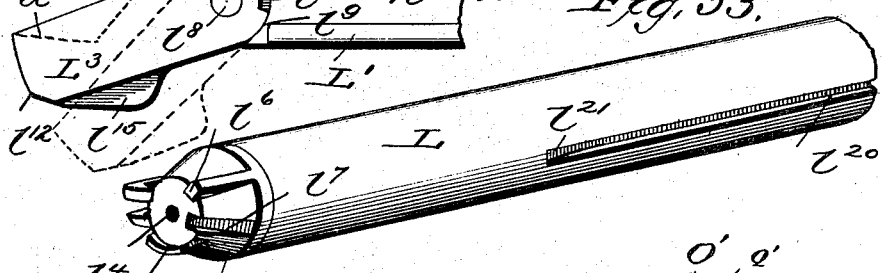
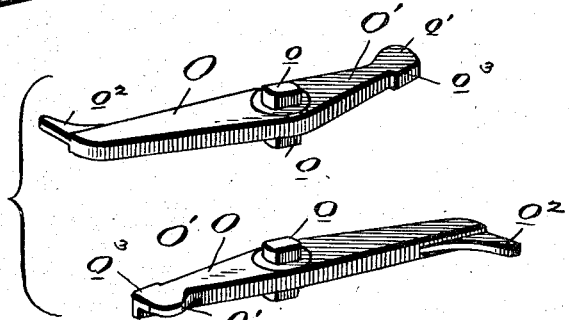
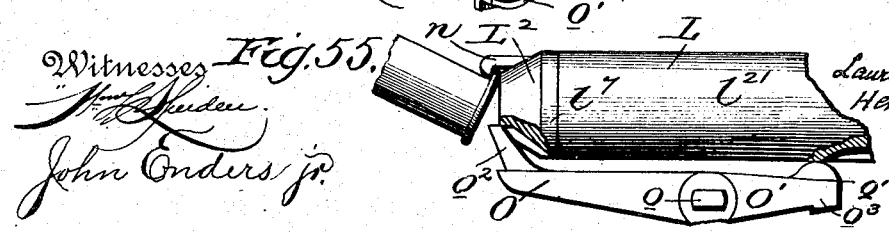
Witnesses
John Enders Jr.
Inventors
Laurence V. Benét,
Henri A. Mercié
by Woodbury Lowery
Attorney (No Model.) 12 Sheets—Sheet 11.
L. V. BENÉT & H. A. MERCIÉ.
AUTOMATIC MACHINE GUN.
No. 564,043. Patented July 14, 1896.
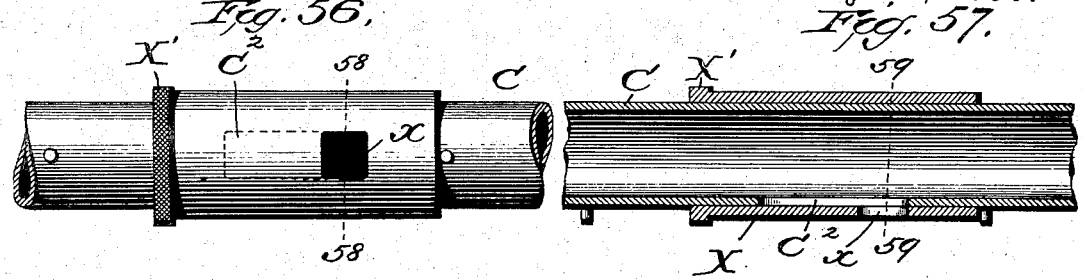
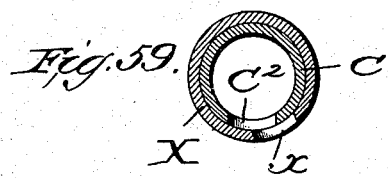
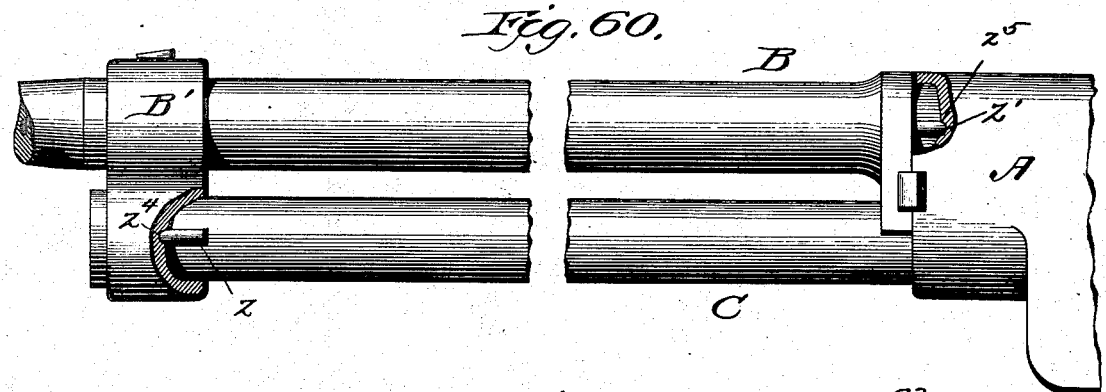
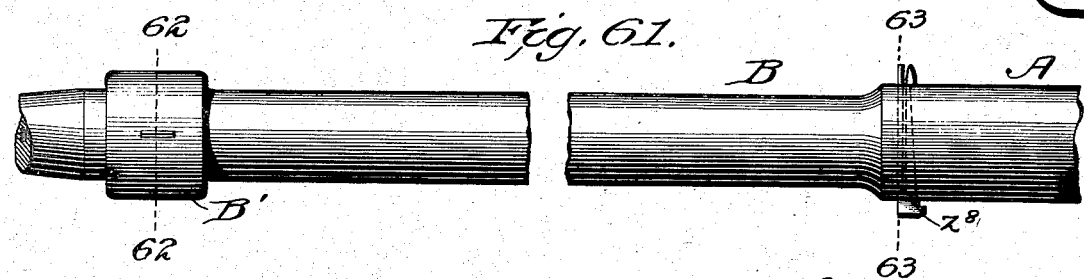
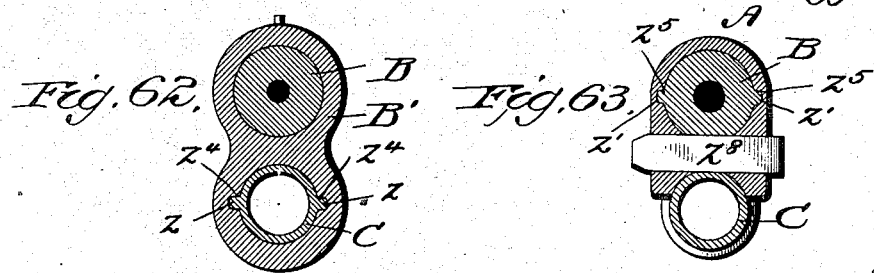
Witnesses
Inventors
Laurence V. Benét
Henri A. Mercié
by Woodbury Lowery
Attorney (No Model.) 12 Sheets—Sheet 12.
L. V. BENÉT & H. A. MERCIÉ.
AUTOMATIC MACHINE GUN.
No. 564,043. Patented July 14, 1896.
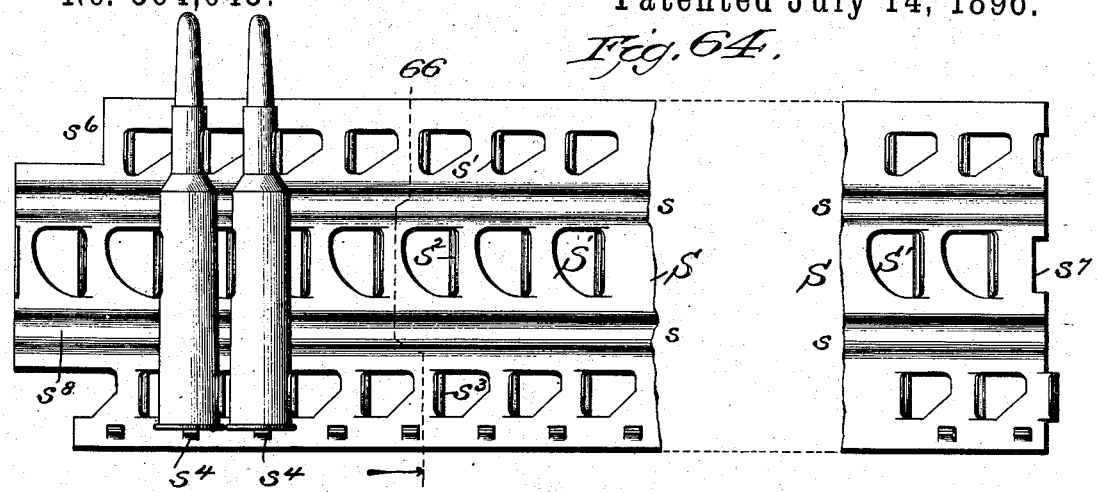
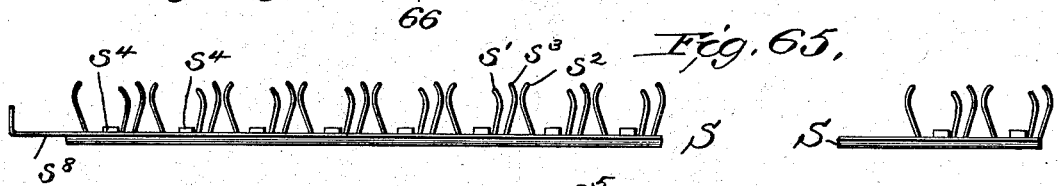
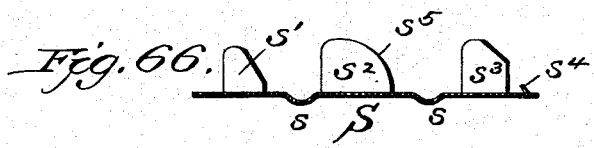
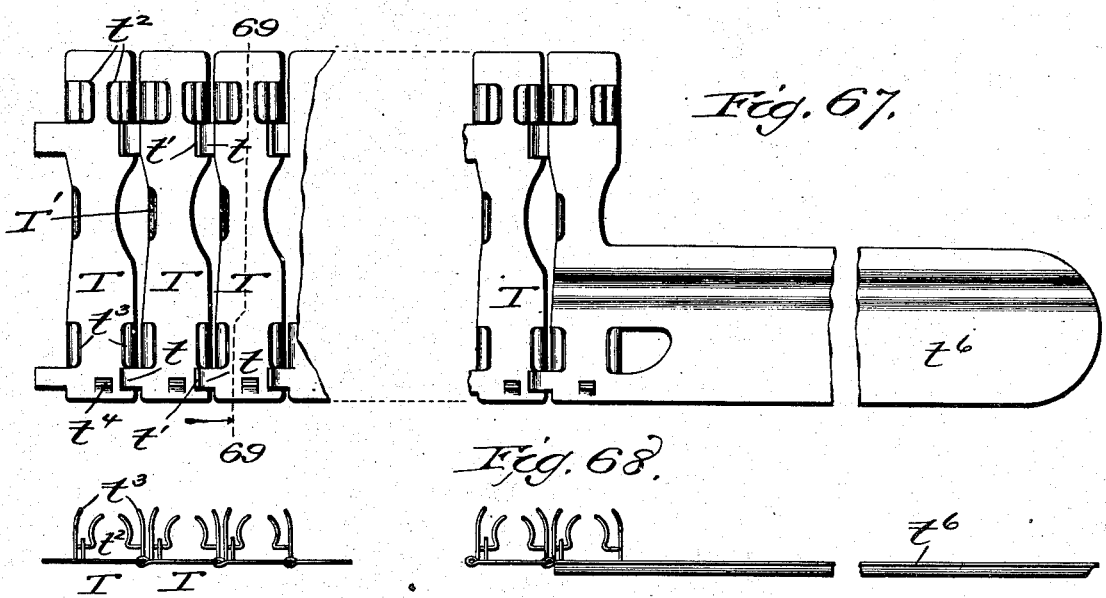
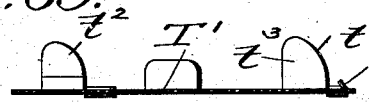
Witnesses
Inventors
Laurence V. Benét,
Henri A. Mercié
by Woodbury Lowery
Attorney

UNITED STATES PATENT OFFICE.

LAURENCE V. BENÉT AND HENRI A. MERCIÉ, OF PARIS, FRANCE, ASSIGNORS TO THE HOTCHKISS ORDNANCE COMPANY, LIMITED, OF LONDON, ENGLAND.

AUTOMATIC MACHINE-GUN.

SPECIFICATION forming part of Letters Patent No. 564,043, dated July 14, 1896.

Application filed February 26, 1896. Serial No. 580,787. (No model.)

*To all whom it may concern:*

Be it known that we, LAURENCE V. BENÉT, a citizen of the United States, and HENRI A. MERCIÉ, a citizen of the Republic of France, residing at Paris, in the Republic of France, have invented new and useful Improvements in Automatic Machine-Guns, of which the following is a specification.

Our invention relates to improvements in that class of guns in which a portion of the gas developed by the explosion of the powder charge is utilized for operating the breech-action and feed mechanism of the arm, and more particularly to that class in which a motor-piston in perpetual engagement with a power accumulator is operated by the gases resulting from the explosion. It is evident, however, that the mechanism about to be described may be applied, in whole or in part, to guns operated by any well-known mechanical means.

The object of our invention is to produce a simple and efficient mechanism whereby, when a certain part thereof is given a reciprocating motion by the action of the powder-gas and a spring, or other mechanical means, all the operations of loading, firing, extracting, ejecting, and cocking are automatically performed and in proper sequence, and to provide also means whereby the rate of fire may be controlled, or the action of the gun interrupted, and to so form all parts of the mechanism that the same may be dismounted or assembled without the use of tools.

To attain these ends, our invention consists in the manner of securing the barrel and cylinder to the chamber or receiver; in the manner of stowing the mainspring or power-accumulator; in the construction of the abutments of the locking-dog, which locks the breech-bolt, when closed; in the structural features and combinations of various elements of the self-contained removable cartridge-feed mechanism; in means by which the motor-piston automatically imparts a positive forward movement to the feed mechanism; in means for automatically locking back the motor-piston when the cartridge-strip is exhausted; in various structural features and methods of mounting the pistol-grip, the trigger, the cocking-handle and its guard, the sear, the extractor, the ejector; in means for controlling the rapidity of fire, and in the structural features and combinations of various other coöperative parts, as hereinafter described.

Figure 44:
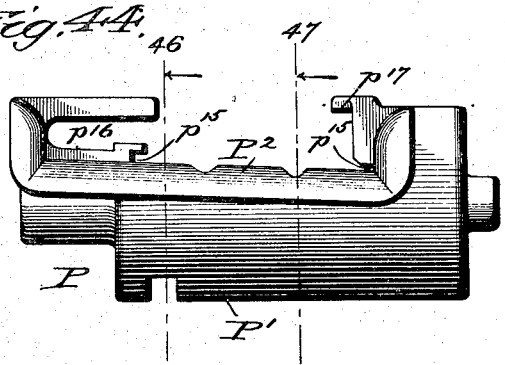
Figure 46:
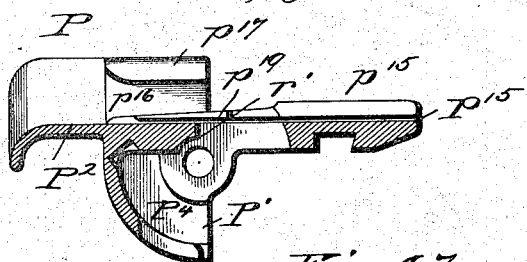
Figure 47:
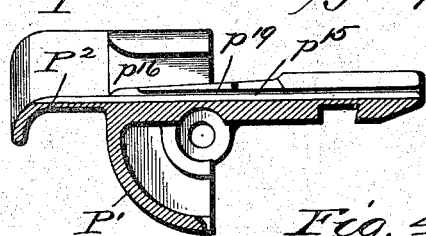
Figure 45:
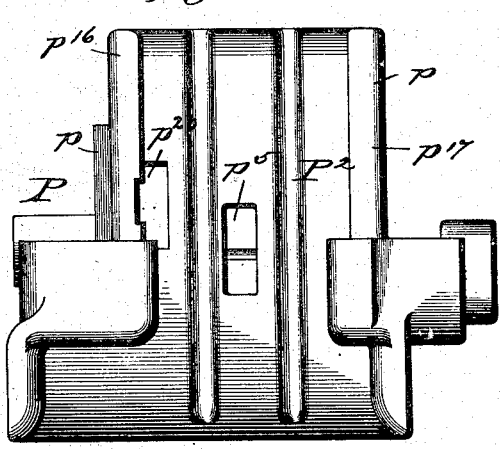
Figure 48:
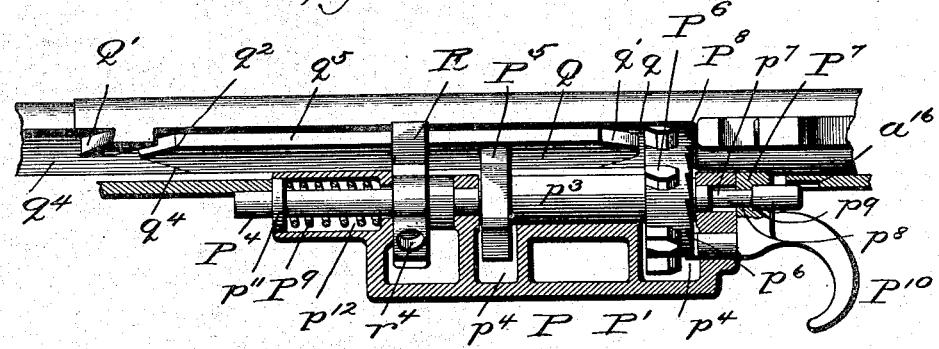

In the accompanying drawings, which illustrate our invention, Figure 1 is a side and Fig. 2 is a plan view of the gun. Fig. 3 is a side and Fig. 4 is a plan view of the receiver. Fig. 5 is a longitudinal and Fig. 6 is a horizontal section of the receiver. Fig. 7 is a longitudinal section through the barrel and cylinder, and Fig. 8 is a plan view of the same. Fig. 9 is an end view of Fig. 7, looking in the direction indicated by the arrow 9, showing the barrel and collar with the cylinder removed. Fig 10 is a rear view of the barrel in Fig. 7, showing the breech where it abuts against the breech-block. Fig. 11 is a cross-section of the cylinder on line 11 11 of Fig. 7. Figs. 12 and 13 are respectively rear and front elevations of the gun. Figs. 14, 15, and 16 are cross-sections on the lines 14 14, 15 15, and 16 16 of Fig. 5, looking in the direction indicated by the arrow. Fig. 17 is a similar view, with the section of piston omitted, on the line 17 17 of Fig. 5, looking in the direction indicated by the arrow, and Fig. 18 is a cross-section on the line 18 18 of Fig. 5, looking in the direction indicated by the arrow. Fig. 19 is a side elevation, and Fig. 20 is a plan view, of the piston. Figs. 21, 22, 23, 24, 25, and 26 are cross-sections on the lines 21 21, 22 22, 23 23, 24 24, 25 25, and 26 26 of Fig. 19, looking in the direction indicated by the arrows. Fig. 27 is a front elevation of the piston. Fig. 28 is a side, Fig. 29 a plan, Fig. 30 a front, and Fig. 31 a rear, view of the sear. Fig. 32 is a detail view in perspective of the front cam portion of the piston. Fig. 33 is a similar view of the cocking-handle. Fig. 34 is a similar view of the rear cam portion of the piston, showing the sear, and Fig. 35 is a similar view of the sear. Fig. 36 is a similar view of the trigger. Fig. 37 is a detail perspective view, with parts broken away, of that part of the receiver in which is seated the removable feed mechanism. Fig. 38 is a detail perspective view of the removable feed mechanism. Fig. 39 is a similar view of the feed mechanism split key. Fig. 40 is a detail perspective view of the feed-gear. Fig. 41 is a similar view of the piston-locking lever operated by the feed-strip. Fig. 42 is a similar view of the feed-mechanism shaft. Figs. 43, 44, and 45 are side, front, and plan views of the feed boxing and guide. Figs. 46 and 47 are sectional views of the feed-box on the lines 46 46 and 47 47 of Fig. 44, looking in the direction indicated by the arrows. Fig. 48 is a horizontal section through the feed mechanism and box on the line 48 48 of Fig. 3. Fig. 49 is a detail perspective view of the front portion of the breech-block with a portion of the extractor broken away. Fig. 50 is a similar view of a portion of the extractor. Fig. 51 is a similar rear view of the breech-block, showing the manner of locking the extractor. Fig. 52 is a detail view in perspective showing manner of uniting the block with its nose-piece. Fig. 53 is a similar view of the breech-block, taken from the opposite side of Fig. 51, showing the groove for operating the ejector. Fig. 54 shows detail perspective views of the ejector. Fig. 55 is a view of the forward end of the breech-bolt, showing the operation of ejecting the empty shell. Fig. 56 is a bottom view, and Fig. 57 a longitudinal sectional view, of a portion of the cylinder, showing the valve. Figs. 58 and 59 are section views on the lines 58 58 and 59 59, respectively, of the two preceding figures. Fig. 60 is a side and Fig. 61 a plan view of a modified way of securing together the barrel, collar, cylinder, and receiver. Figs. 62 and 63 are cross-sections on the lines 62 62 and 63 63 of the two preceding figures. Figs. 64 and 65 are plan and side views of the elastic feed-strip. Fig. 66 is a section of the same on the line 66 66 of Fig. 64. Figs. 67 and 68 are plan and side views of the flexible feed-strip, and Fig. 69 is a section of the same on the line 69 69 of Fig. 67.

In all the figures like letters denote like parts.

We shall first describe our mechanism in detail and later on explain the general working of the gun.

In the drawings our invention is shown as applied to a rifled caliber machine-gun, but it is evident that the same devices may be applied to guns of larger caliber.

A, Fig. 1, is the receiver which contains the operative mechanism of the gun, which may be a single forging or casting of metal, and which bears at its forward end the trunnions A' A' or other device for supporting the gun on its carriage. In the front end of the receiver is screwed or otherwise atttached the barrel B, which is rifled and chambered in the usual manner. We generally make this barrel greater in thickness than is usual in small arms of like caliber, in order that it may better resist the heat developed by rapid firing, and that it may be as free as possible from vibrations. Toward the muzzle end of the barrel is secured by shrinkage or otherwise the collar B', on which we sometimes mount the foresight $B^2$, and which serves as a support for the forward end of the cylinder C. Through the cylinder, collar, and barrel is formed the canal C', bringing the bore in communication with the cylinder, and which may be circular or of other form in cross-section.

To the rear of the collar a port $C^2$ is formed through the walls of the cylinder, and when this port is unmasked by the movement of the piston D to the rear, any gas passing from the bore of the gun into the cylinder will exhaust into the open air. As shown in Figs. 5, 6, and 7, the barrel is screwed into the receiver at its rearward end, and the cylinder into the collar at its forward end. A key $B^3$ is driven through a slot in the receiver and bearing in keyways in the barrel, and the cylinder locks the whole together. In the cylinder C is lodged the piston D, which has a longitudinal reciprocating motion under the influence of the gas drawn from the barrel acting on its forward end and the mainspring E.

Beginning at the front end of the piston we find a cylindrical head or guide D', which receives the pressure of the gas drawn from the barrel, and which serves to guide the piston in the cylinder. To the rear of this is formed the annular groove $D^2$, which acts as a gas-check and which may or may not contain a spring or other packing. It will be observed that the interior diameter of the cylinder is essentially that of the piston up to the point $C^3$, which is slightly to the rear of the extreme rearward position of the piston. To the rear of this point the interior diameter of the cylinder is increased in order to give a sufficiency of clearance to reduce friction. To the rear of the groove $D^2$ the piston is provided with four or more grooves $D^3$ $D^3$, which provide for any accumulation of powder residue which may work its way to the rear of the piston-head.

Under the piston is formed the tang $D^4$, Fig. 32, which takes the thrust of the mainspring E and provides a seat for the cocking-handle F, Fig. 33. This is a single piece of ⊥-shaped metal, the lower portion $f$ of which is curved to fit the fingers of the man operating the gun, and is provided with the key $f'$ and the hook-shaped portions $f^2$, which fit into corresponding recesses $d'$ $d^2$ in the tang $D^4$, and with the upward projection $f^3$, which registers with a recess $d^3$ in the body of the piston. The object of this key, hook, and projection is to hold the handle firmly against any longitudinal effort, and to permit shipping it vertically into its seat.

The cocking-handle F has a longitudinal motion in a cylindrical chamber $A^2$ in the receiver A, which contains the mainspring E, and its finger-grip $f$ projects through a longitudinal bottom slot $A^3$ in the chamber, in which it is supported by two lateral guides $f^4$ $f^4$, along the narrow forward portion of the slot, extending from $a$ to $a'$, but can be withdrawn through the wider portion of the slot extending rearward from $a'$. To the rear the cocking-handle F, Figs. 5 and 33, is provided with the cylindrical recess $f^5$, which affords a seat for the end of the mainspring E. Thus it is evident that when the mainspring is in place it will prevent the cocking-handle from falling out of its seat. Hence, if the cocking-handle be in place, it can only be dismounted by first removing the mainspring and then withdrawing the piston to the rear.

A downward-projecting guard $A^4$, Figs. 1, 3, 5, and 37, extends entirely around the slot $A^3$, inclosing the finger-grip $f$, to protect the hand of the gunner.

Still further to the rear of the piston D is lodged the sear G, which serves to hold the piston to the rear when engaged with the trigger. The sear G, Figs. 28, 29, 30, 31, and 35, consists of a single piece of steel provided with the cocking-notch $G'$, and the bearings $g \, g$, which fit into corresponding recesses $d^4$ in the piston, Fig. 34, and resist the thrust of the latter. To the front the sear is provided with the axes $g' \, g'$, which fit in bearings $d^5$ in the piston, and the bearings $g \, g$ are concentric with these axes. It is therefore evident that the sear may be swung about its axis and out of its seat. To provide for the complete removal of the sear, the axes $g'$ are flattened along the surfaces $g^2 \, g^2$, and a corresponding opening $d^6$ is made to their seat in the piston. When swung sufficiently to the front, the flattened portion of the axis registers with this opening and the sear may be removed from the piston.

In the lower part of the receiver, Figs. 5 and 36, is mounted the trigger H, which consists of a single piece of steel provided with the finger-piece $h$. A cylindrical aperture $h'$ is pierced through the body of the trigger to permit the passage of the mainspring, as shown in Fig. 5. The trigger is seated in a recess $D^5$, having an upper rearward seat $d^7$, worked in the receiver, (see Fig. 5,) which is so formed that the trigger is held between its projecting bearings $h^2$, which enter said seat $d^7$ and the opposite surface $d^8$ of the recess $D^5$, which is concentric with said bearings. The recess $D^5$ is enlarged downward from the trigger-bearings seat $d^7$ toward the rear, so that the trigger may revolve about its pivot on its bearings $h^2$ until the rear surface $h^3$ of the trigger strikes the rear surface $d^9$ of the trigger-recess. In this position the trigger is disengaged from the front surface $d^8$ of the recess and may be withdrawn from its seat after the removal of the mainspring. On the upper surface of the trigger is formed the cocking-notch $H'$, which enters the guide-groove $D^6$ in the lower surface of the piston to the rear of the sear G, Fig. 34, and engages with the sear G when the piston is in its rearward position. The pistol-grip I, Fig. 5, consists of a single casting comprising the grip $I'$ and the trigger-guard $I^2$, and is secured to the receiver A by the hooks $i \, i$. Between the trigger H and the pistol-grip I is located the sear-spring $G^2$, which consists of the spiral spring $G^3$, having one extremity seated in a recess $h^4$, located in the trigger to the rear of the finger-piece $h$, and the other extremity held by the stud $i'$ on the front of the pistol-grip, so that the sear-spring $G^2$ tends to press the trigger to the front. It is thus seen that when the pistol-grip I is in place the trigger H cannot be sufficiently revolved to the rear to become disengaged, as its movement is limited by the finger-piece $h$ striking the surface $i^2$ on the pistol-grip.

The shoulder-piece J, Fig. 5, consists of a single casting comprising in one the abutment for the mainspring $J'$, the shoulder-piece proper, $J^2$, and the cover for the mechanism $J^3$. On the inner side of the mainspring abutment J is formed the stud $j$, which supports the rear end of the mainspring E. The inner surface $j'$ serves as a stop for the piston in case it is thrown violently to the rear by the action of the powder-gas and the abutment, projecting downward over the rear end of the pistol-grip I, prevents the grip from being unhooked by being withdrawn to the rear. The shoulder-piece is secured to the receiver A by means of the lugs $j^2$ at its front end, which engage in corresponding recesses $a^2$ in the receiver, Fig. 1, and the pin $J^4$, which passes through the ears $A^{10}$ on the rear of the receiver and shoulder-piece, as shown in Figs. 1, 3, 4, and 5. The pin $J^4$ is provided, Figs. 3 and 6, with a spring-handle $J^5$, terminating in a button $J^6$, and the pin carries a small stud $j^3$, which engages in an annular slot $a^3$ in the receiver. Under the button $J^6$ is a small lug or projection $j^4$, which engages in a corresponding recess $a^4$ in the side of the receiver. To remove the pin $J^4$, it is grasped by the button $J^6$ and the lug $j^4$ sprung out of its recess $a^4$, when the handle $J^5$ may be turned one hundred and eighty degrees to the rear, freeing the stud $j^3$, and the pin may now be withdrawn.

The breech-block L, Figs. 5, 6, and 49 to 53, is seated in guides in the upper part of the receiver A in line with the axis of the bore. Its general form is cylindrical, but to the rear it is partially squared and flared to form two guides $L' \, L'$, which fit in grooves $a^9 \, a^9$ in the receiver, Fig. 18. The breech-block is bored axially to form a chamber for the firing-pin M, and a longitudinal groove $l$ is worked in the bottom of this chamber to receive the guide-lug $m$ of the firing-pin, Figs. 14, 15, and 16. The firing-pin chamber is counterbored to the front to receive the nose-piece $L^2$, which is secured by means of two or more lugs $l'$ on its stem, which engage in corresponding grooves $l^2$ in the counterbore. Slots $l^3$ the width of the above lugs lead to the grooves in such manner that if the nose-piece be given half a turn the lugs will register with the slots, and the nose-piece may be withdrawn. The nose-piece is pierced with a passage $l^4$ for the firing-pin, and on its front face is provided with the lip $l^5$ and the lug $l^6$, which hold the flange of the cartridge against the spring of the extractor. Between the lip and the lug just mentioned a slot $l^7$ is formed to permit the ejector to pass under the head of the cartridge.

To the rear of the breech-block L, Fig. 5, is journaled the locking-dog $L^3$ on the rivet $l^8$, which passes through dog and breech-block. This rivet fits the breech-block very loosely in order that the pressure of the cartridge on the breech-block may be delivered directly to the dog on its head $l^9$ and not through the rivet. The movement of the locking-dog about its pivot is limited by its upper face $l^{10}$ coming into contact with the overhanging under face surface $l^{11}$ of the breech-block, as shown in Fig. 51. In Fig. 5 the locking-dog is shown in the position of the breech closed, and in this position it transfers the pressure of the cartridge to the two small abutments $A^5$, seated in the receiver, Figs. 5 and 17, against which bears the rear end $l^{12}$ of the dog, the surface of which is cut concentrically with the rivet $l^8$. To unlock the dog and open the breech, it is necessary to raise the former until the faces $l^{11}$ and $l^{10}$ are in contact, when the rear end $l^{12}$ of the dog will be clear of the abutments $A^5$.

The firing-pin M, located in the chamber in the forward part of the breech-block L, is provided with a lug $m$, which travels in a longitudinal groove $l$ in the bottom of the chamber. The rear end of the firing-pin projects into a vertical slot or chamber $L^4$, formed in the rear of the breech-block L above the piston D, and is provided with a downwardly-projecting toe $m'$.

The breech-block L and firing-pin M are brought into engagement with the piston D in the following way, (see Fig. 5:) Above the emplacement of the sear G the piston D is provided with two tangs $D^7$ and $D^8$, which project up into the slot $L^4$ of the breech-block L and have a limited longitudinal play between the front and rear abutments $l^{13}$ $l^{14}$ of the slot $L^4$, and between which engage the downward-projecting toe $m'$ of the firing-pin M. When the piston D moves to the rear, the tang $D^7$ of the piston striking the toe $m'$ of the firing-pin M withdraws it. As the piston D continues its rearward motion, withdrawing with it the firing-pin M, the lifting-cam $L^6$, located on the upper face of the piston D to the rear of the tang $D^8$, passing under the downward projection $l^{15}$ on the locking-dog, raises it until it finally rests upon the lifting-cam $L^5$, constituting a forward extension of the cam $L^6$, in which position the rear end $l^{12}$ of the dog has cleared the abutments $A^5$. As the piston D continues to the rear the heel $D^9$ on the rear of the tang $D^8$ strikes the rear abutment $l^{14}$ of the slot $L^4$, withdrawing the breech-block, and opening the breech, while the rear end $l^{12}$ of the dog $L^3$ rests upon the guide-surfaces $a^{10}$, Fig. 6, formed in the rear end of the receiver A, from which it is prevented from swinging into the locked position, except when in line with its abutments $A^5$.

The closing of the breech is effected by the forward movement of the piston D in the following way: On the rear end of the piston D is an upward and forward curved locking-cam $D^{11}$, the front face of the cam having an inwardly-beveled cam-face $d^{12}$. When the piston moves forward to close the breech, the cam-face $d^{12}$ of the locking-cam $D^{11}$ comes in contact with the rear end $l^{12}$ of the dog, and as the latter cannot descend on account of its bearing on the guides $a^{10}$ $a^{10}$, the breech-block is pushed to the front and the breech closed. When the breech is closed, further movement of the breech-block L is impossible, and the locking-dog $L^3$ is in line with its abutments $A^5$, and no longer held up by the guides $a^{10}$ $a^{10}$. The piston D continuing its movement, the cam $d^{12}$ forces the locking-dog $L^3$ downward into engagement with its abutments $A^5$, whereupon the groove $d^{13}$ in the upper face of the rear end $l^{12}$ of the locking-dog registers with the lower cam-face $d^{14}$ of the locking-cam $D^{11}$, and the locking-cam $D^{11}$, entering the groove $d^{13}$, prevents any unlocking of the dog. Continuing the forward motion of the piston, the tang $D^8$ forces forward the firing-pin M, which strikes the primer and explodes the cartridge.

Guides $D^{10}$, working in groove $a^9$ in the rear of the receiver, Fig. 5, hold the piston D securely against the effort necessary to maneuver the locking-dog.

The extractor N consists of a single steel shank $N'$, Figs. 49 and 50, the front end of which is divided into two branches $n$ $n$, each of which is provided with a hook to grasp the flange of the cartridge. The extractor is seated in a groove $l^{16}$ in the right side of the breech-block L, which seat is continued through the nose-piece $L^2$, as shown at $l^{17}$, Fig. 52, so that the nose-piece $L^2$ cannot be turned when the extractor is in place. The extractor is held in place by the hooks $n$ $n$, which engage under recesses $l^{18}$ in the breech-block by just the distance between the hooks of the extractors $n$ $n$ and the front face of the nose-piece $L^2$. Hence to dismount the extractor it is only necessary to push it to the rear, when the hooks $n'$ $n'$ will be freed from their seats. This cannot be done when the breech-block is in the gun, as the rear end $n^2$ of the extractor bears against the head $l^9$ of the locking-dog $L^3$ when the latter is mounted in the receiver. When, however, the breech-block is removed from the gun, the dog $L^3$ may be turned vertically downward, when the end $n^2$ of the extractor will register with the recess $l^{19}$ in the head $l^9$ of the dog. In this position the extractor may be pushed to the rear and dismounted. The extractor is divided into the two branches $n$ $n$ in order that the recesses $b$ $b$, Fig. 10, in the funnel-shaped extension $B^4$ of the chamber, made in the rear of the barrel to permit the passage of the extractor, may not be sufficiently wide to permit the bullet of a cartridge to engage therein and cause a jam.

On the left side of the receiver, Figs. 3, 4, 6, and 37, is formed the housing $A^6$ for the ejector O, which has a longitudinal opening $a^{12}$ for the introduction of the latter. A bearing $a^{13}$ is drilled vertically through the housing to receive the ejector-trunnions $o$, and a passage $a^{14}$ is slotted into this hole. The ejector O, Figs. 6, 54, and 55, consists of a single piece of steel provided with trunnions $o$ $o$. These trunnions are flattened in the direction of the length of the ejector, as shown in Figs. 54 and 55, in such a manner that the breech-block being removed from the receiver, Fig. 6, the ejector-arm O' may be passed through the opening $a^{12}$, and the flattened portion of the trunnions $o$ slipped through the passage $a^{14}$ and the trunnions engaged in the bearing $a^{13}$. If the ejector be now turned until parallel to the axis of the gun, the trunnions can no longer be withdrawn through the passage $a^{14}$, and the ejector is in place.

The ejector being mounted in its housing, the inner lug $o'$ on its arm O' engages in a longitudinal guide-groove $l^{20}$ in the breech-block L, and assuming the ejector to be in its position with reference to the breech-block at the moment of ejection, as shown in Fig. 55, its toe $o^2$ has entered into the seat $l^7$ in the nose-piece $L^2$ and is in line with the head of the cartridge as held by the extractor. The ejector is positively held in this position, as the inner lug $o'$ of the arm O' bears against the side of the breech-block at the forward end of the guide-groove $l^{20}$ and the outer lug $o^3$ on the same arm against the ejector-housing, as indicated by the drawings. As the breech-block moves forward to close the breech, the inclined surface of the bottom of the slot $l^7$ in the nose-piece strikes the toe $o^2$ of the ejector, raising the latter. At this moment the groove $l^{20}$ in the side of the breech-block comes in line with the inner lug $o'$ and the latter enters the groove as the toe $o^2$ rides up on the side of the breech-block. Hence as the block moves forward to push a cartridge into the chamber, the ejector is withdrawn from action. As the breech opens to extract an empty cartridge-case the ejector is inoperative until the inclined surface $l^{21}$ at the head of the groove $l^{20}$ strikes the inner lug $o'$ on the ejector-arm O', causing the ejector to pivot about its trunnions and forcing the toe $o^2$ to follow the slot $l^7$ and bringing the toe in line with the head of the cartridge. Striking the toe, the cartridge is knocked free from the extractor and ejected through the aperture $L^7$ in the receiver, Fig. 37.

The feed mechanism, Figs. 14, 15, 16, and 38 to 48, is contained in the box P, which affords bearing and housing within the case P' for the operative parts, and guides on the feed-table $P^2$ for the feed strips or bands.

Through bearings in the lower part P' of the feed-box passes the shaft $P^4$, on which is mounted the sleeve $p^3$, having integral therewith the feed-wheel $P^5$ and the cam-pinion $P^6$. The sleeve $p^3$ with its feed-wheel and pinion revolve in chambers $p^4$ of the case P', which keep it from longitudinal motion along the shaft, and the upper portion of the feed-wheel $P^5$ projects through the slot $p^5$ of the feed-table $P^2$. On the head of the shaft $P^4$ is mounted an arm $P^7$, carrying at its extremity the pawl proper, $p^6$, which extends through a slot in the side of the casing P' and engages a ratchet $P^8$ on the face of the cam-pinion $P^6$. These ratchet-teeth, of which there are two for every one of the cam-pinion, are so disposed that when in engagement with the pawl they permit of the revolution of the pinion forward but not to the rear. The arm $P^7$ also serves to lock the end of the feed-shaft $P^4$ from longitudinal motion in one direction in the following way:

The feed-shaft $P^4$ is reduced in diameter at $p^7$ near its head for a distance corresponding to the thickness of the arm $P^7$, and an aperture $p^8$ of this same diameter is bored part way through the pawl-arm, on one side connecting with a counterbore $p^9$, from the other side of enlarged size to admit for a short distance the full diameter of the feed-shaft head, as shown in Figs. 42 and 48. A passage $p^{10}$ of the width of the reduced portion $p^7$ of the feed-shaft leads into this shaft-bearing $p^8$ $p^9$ and is formed concentrically with the pawl $p^6$. Hence when the neck $p^7$ of the shaft is in the aperture, the pawl may be revolved about itself and freed from the shaft, but when the head of the shaft enters the counterbore $p^9$ this is not possible. The head of the shaft $P^4$ is held in the counterbore $p^9$ by the tension of the pawl-spring $P^9$, bearing against the collar $p^{11}$ on the shaft $p^4$, and which is lodged in the cylindrical chamber $p^{12}$ in the case P'. On the head of the pawl a handle $p^{10}$ is formed, and this permits withdrawing the pawl from engagement with the ratchet-teeth when desired.

Immediately to the rear of the breech and below the path of the breech-block (see Fig. 37) a chamber is worked in the receiver A, into which the feed-box P with its contained mechanism fits. On inserting the feed-box into its seat, it is secured to the receiver A by means of the projecting guides $p$ $p$ on the feed-table $P^2$, which fit into corresponding mortises $p'$, cut through the receiver. When thus placed, the feed-table $P^2$ projects through and beyond the aperture in the receiver A, and the feed-box is held in place by means of the split key $P^3$, which fits into a dovetail slot in the lower side of the box, and abuts against the side of the receiver. (See Figs. 4, 14, 15, and 39.) This key is provided with the handle $p^2$, by means of which it may be withdrawn from its seat. The mechanism in the case P' of the feed-box now rests in the following position: The end of the feed-shaft $P^4$, carrying the pawl-spring $P^9$, rests in a recess $a^{15}$ of the receiver, and its end abutting against the end of the recess, motion to the left is prevented. To the right the head of the shaft engages in the recess $a^{16}$ of the receiver, which is of such length as to permit of sufficient movement of the shaft to the right against the tension of the pawl-spring $P^9$ to release the pawl $p^6$ from the ratchet $P^8$, but not enough to permit the shaft-head to be freed from the counterbore $p^9$, and finally the cam-pinion $P^6$ lies in the slot $a^{17}$, directly in the path of the cam Q on the piston D, (see Figs. 5 and 48,) which, by its engagement with the cam-pinion $P^6$, imparts to it a positive forward motion, thus rotating the feed-wheel $P^5$, which feeds the cartridge-bands to the breech, as hereinafter described.

Referring to Fig. 48, which shows the piston D in its forward position, (breech closed,) it will be observed that the teeth of the cam-pinion $P^6$ fall in the open space $q$ to the rear of the cam Q, and pawl $p^6$ being drawn out of engagement with the ratchet $P^8$ the pinion is free to turn in either direction. In this position the feed-strip may be engaged or withdrawn from engagement with the feed-wheel $P^5$, as hereinafter described. As the piston D moves to the rear the cam Q will engage between two teeth of the pinion $P^6$, the pointed end $q'$ of the cam bringing the pinion into position if it is not exactly in line. The pinion will then be positively held, as shown in Fig. 16. While thus held, the operations of extracting and ejecting the empty cartridge-case will be performed. When these operations are completed, the piston continuing its rearward movement, as the forward end $q^2$ of the cam Q withdraws from between the teeth of the pinion $P^6$ the cam $Q'$, located at this point on the piston D, strikes the inner tooth of the pinion, causing the latter to revolve through an arc equal to about one-half of the pitch of the teeth, and continuing the motion the teeth arrive in line with the open space $q^3$ on the piston, and in this position the pinion $P^6$ is again free to revolve and the feed-strips may be engaged or disengaged from the feed-wheel, the pawl being disengaged, as already described. The gun is now cocked and the breech-block open. As the piston moves forward to close the breech and fire the gun, the bevel-face $q^4$ of the cam Q strikes the tooth considered above, causing the pinion to revolve the remainder of the pitch of the teeth, and the following tooth strikes the face $q^5$ of the cam Q. At this moment the breech-block strikes a cartridge in the feed-strip and loads it in the chamber, as hereinafter described, and during this motion the pinion is positively held by a tooth engaging on either side of the cam Q, as shown in Fig. 16. It is thus seen that when the piston is in either of its extreme positions to the front or rear, and the pawl withdrawn, the pinion $P^6$ is free to turn in either direction; that while the breech-block is either forcing a cartridge into the chamber or extracting it, the pinion is positively held, and that immediately after the ejection and before the breech-block strikes a fresh cartridge the pinion revolves through an arc equal to the pitch of its teeth through the action of the cams $Q'$ and the bevel-face $q^4$ of cam Q.

The pinion $P^6$ is prevented from following the cam $Q'$ instead of the bevel-face $q^5$ of the cam Q on the piston moving forward, by the ratchet $P^8$, in which the first of the two teeth corresponding to each tooth of the pinion is so placed that it engages with the pawl $p^6$ as soon as the pinion-teeth are in position to receive the point $q'$ of the cam Q between them and the second ratchet-tooth engages as soon as the pinion-tooth has been revolved by the cam $Q'$.

To keep the breech open when a feed-strip has been exhausted, we provide the lock R, Figs. 38, 41, and 48, which consists of a lever formed of a single piece of steel loosely threaded upon the feed-shaft $P^4$ within the chamber $p^{12}$ of the feed-case, having one arm $r$ projecting through a slot $p^{20}$ in the feed-table $P^2$ in the wake of the passage of the feed-strip, in which position it is held by the lock-spring $r^3$, which engages in the seat $r^4$ in its lower arm $r^7$ and bears against the spring-box, as shown in Fig. 14. When in this position, the toe $r^5$ on the arm $r^7$ is in the wake of the locking-lug $R'$, Fig. 32, on the piston D, and when the latter is in its extreme rearward position, slightly to the rear of the position in which the sear and trigger engage, the toe $r^5$ drops in front of the lug $R'$ and prevents the forward movement of the piston. It follows that when the feed-strip is pushed into place over the feed-table $P^2$ the lever-arm $r$ is depressed and the toe $r^5$ removed from engagement with the locking-lug $R'$. Hence, when the feed-strip is in place the lock is inoperative, but when the strip is exhausted the lever is released and the toe holds the piston to the rear, thus obviating the necessity of recocking the gun for each fresh strip.

The feed-strip S, Figs. 64 to 66, consists of a narrow sheet of brass, tin, or other elastic material and may be of any convenient length, containing in general from twenty to fifty cartridges. Longitudinal ribs $s$ $s$ are formed to give it stiffness. Three rows of clips $s'$ $s^2$ $s^3$ are formed, as shown, to hold the cartridges. The front row of clips $s'$ embraces the cartridges at the neck from the right, the middle row $s^2$ holds the bodies of the cartridges from the left, and the rear row $s^3$ holds the cartridges near the heads from the right. Small projections $s^4$ are thrown up in line with the cartridge-heads and prevent withdrawal of the cartridges to the rear. The openings $S'$, formed in the strip when the clips $s^2$ are thrown up, are so formed that the front sides are spaced to the pitch of the feed-wheel $P^5$, the teeth of which engage therein, as shown in Fig. 60. Also the rear edges of the clips $s^2$ are rounded, as shown at $s^5$, to aid in raising the head of the cartridge to the level of the chamber. To the rear the strip is cut away at $s^6$ to permit the lever-arm $r$ of the lock R, Fig. 15, to rise when the last cartridge in the strip is in the loading position.

The abutment $s^7$ is formed on the front of each strip to engage the feed-wheel on the introduction of the strip into the feed-table and the tail $s^8$ on the rear to accomplish its ejection.

The feed-box, Fig. 38, is grooved at $p^{15}$ to receive the edges of the feed-strip, and also provides a guide $p^{16}$, which guides the bullet of the cartridge, and a guide $p^{17}$, which guides the head of the cartridge. The guides $p^{16}$ and $p^{17}$ are so placed with reference to the guides $p^{15}$ that the bullet and cartridge-head guide the band into the latter; that is, the cartridge is firmly held by the guides $p^{16}$ $p^{17}$ before the band reaches the entrance of the guides $p^{15}$. In the receiver of the gun above the feed-table $P^2$ is formed the tongue $A^7$, Fig. 37, which passes under each cartridge and over the band as the band is fed into the gun. This piece serves to lift the cartridge out of the clip and, guiding it up the incline $p^{19}$ on the feed-table, Figs. 46 and 47, brings it to the loading level. The cartridge is stopped by the abutment $A^8$ on the receiver, against which it is held elastically in line by its clip $s^2$ as the strip advances under the influence of the feed-wheel.

The general action of the gun is as follows: Assuming the breech-block to be closed, as shown in Fig. 5. To load the clip, S is engaged in the guides $p^{16}$ $p^{17}$ of the feed-box and pushed firmly home. The abutment $s^7$ of the strip strikes the feed-wheel $p^5$, causing the latter to revolve in engagement with the opening S' of the strip $s^2$ until the first cartridge strikes the side of the breech-block L. At this moment the pawl $p^6$ engages with one of the teeth of the ratchet $P^8$ and the cartridge is held in position preparatory to the operation which brings it into alinement with the cartridge-chamber and frees it from the strip. Grasping the cocking-handle F the piston is drawn to the rear and the cam Q engages between two teeth of the pinion $P^6$ and holds it firmly in place. The tang $D^7$ bearing against the toe $m'$ of the firing-pin M withdraws the latter, when the cam $L^6$ strikes the projection $l^{15}$ on the locking-dog $L^3$, raising the latter, which now rests on the cam-bearing $L^5$. The tang $D^8$ now strikes the abutment $l^{14}$ of the breech-block, withdrawing the latter, the dog now being supported by the guides $a^{10}$, Fig. 6. The breech-block is now withdrawn and the cam Q' on the piston strikes a tooth of the feed-pinion $P^6$, causing the pinion to revolve and bringing the first cartridge partially in line with the chamber. The pawl $p^6$ now engages a second tooth in the ratchet $P^8$ and prevents the feed-pinion from turning backward. The sear G now engages with the trigger-notch H' and the gun is cocked. In the meantime the feed-strip S has ridden over the lever $r$ of the lock R, depressing the former and withdrawing the toe $r^5$ from the line with the locking-lug R'. If the trigger be pulled freeing the cocking-notch H' from the sear G, the mainspring E, acting on the tang $D^4$, will throw the piston to the front. The cam-face $d^{12}$ of the locking-piece $D^{11}$, bearing on the rear end $l^{12}$ of the dog, will move the breech-block forward, as the dog cannot descend on account of the guides $a^{10}$. The bevel-face $q^4$ of the cam Q now strikes a tooth on the feed-pinion $P^6$, causing the latter to revolve and forcing the feed-strip farther into the receiver. The tongue $A^7$, passing under the first cartridge, lifts it partially from the clip and it is pressed firmly against the abutment $A^8$, the bullet riding up the incline $p^{19}$, Figs. 46 and 47. The lip $l^5$ on the nose-piece $L^2$ now strikes the head of the cartridge, forcing it out of the clip, the head of the cartridge riding over the rounding $s^5$ of the clip $s^2$, and the cartridge is forced into the chamber. When fully home, the breech-block is stopped by striking the entrance of the chamber, and the surface $l^{12}$ of the locking-dog is in line with the abutments $A^5$. The cam $d^{12}$ now forces the dog into place and the breech is locked. The tang $D^8$ now strikes the firing-pin and fires the cartridge. When the bullet has passed the entrance of the canal C', the powder-gas passes into the cylinder C, and acting on the head D' of the piston D drives the latter to the rear. When the breech was closed, the hooks $n$ $n$ of the extractor N were sprung over the flange of the cartridge and the latter was held between the extractor and the lip $l^5$ on the nose-piece. As the piston moves to the rear the empty cartridge-case is withdrawn from the chamber, and when the breech is fully open the inclined face $l^{21}$ at the head of the ejector-guide slot $l^{20}$ strikes the inner lug $o'$ on the ejector, causing the toe $o^2$ on the latter to come in wake of the cartridge-head. The ejector striking the head the cartridge is forced out of the grasp of the extractor, and is ejected through the opening $L^7$ on the opposite side of the gun. If the trigger be released, it will engage with the sear and the gun will be ready for another shot. If the trigger be held back, the spring will immediately return the piston and fire will continue until the feed-strip is exhausted. When the last cartridge is in the loading position, the lever $r$ on the feed-lock R will spring up through the slot $p^{20}$ in the feed-table $P^2$ and the opening $s^6$ on the loading-strip S, and the toe $r^5$, engaging with the locking-lug R', will hold the breech open. A new strip may now be introduced and pushed home until the first cartridge brings up against the abutment $A^8$ on the receiver, when the locking-lever $r$ will again be depressed, and fire may again be resumed. If it be required to withdraw a partially-expended feed-strip, the pawl $p^6$ is released from the ratchet by pulling the handle and the strip pulled out. This may be done with either the breech open or closed.

The safety-bolt K, Figs. 1, 2, 3, and 5, consists of a shaft K′, which traverses the receiver, one half of which is slotted away (see Fig. 5) to permit the passage of the piston when firing, and the piston D is cut away on its lower side from the point $d^{10}$ to the rear, to permit it to ride over the safety-lock shaft K′, when the latter is in its unlocked position with its slotted portion uppermost, as shown in Fig. 5. When the piston is in its rearward position, the sear G, being in engagement with the cocking-notch H′ of the trigger H, the safety-bolt registers with the recess $d^{11}$ in the piston. If the bolt be now turned to the safety position at an angle of one hundred and eighty degrees, it acts as an eccentric cam entering the recess $d^{11}$ and withdrawing the piston toward the rear and releasing the cocking-notch and sear from the strain, and when the piston is in its forward position, as after firing, if the slotted shaft K′ be again turned to the position of safety it will fall in the path of the piston and prevent its rearward motion. As shown in Figs. 1, 2, 3, and 4, the safety-bolt K is fitted with the spring-handle $K^2$, to the end of which is secured the button $K^3$, under which is a small stud $k$, which registers with corresponding recesses $a^5$ $a^6$ in the side of the receiver in the two positions of "fire" and "safety." The bolt is limited in its movement by the stops $a^7$ and $a^8$. The flexibility of the handle $K^2$ will, however, permit the stud $k$ to be sprung over these stops and the handle brought to an essentially vertical position, in which position the stud $k^2$ becomes free from its seat and the bolt may be withdrawn from its seat similarly to the locking-pin of the shoulder-piece.

To dismount the gun, proceed as follows: Pull out the key securing the feed-box; withdraw the latter; press out the head of the feed-shaft; swing the pawl about itself and remove; pull out the feed-shaft; remove the pawl-spring, drop out the feed-pinion; drop out the lock and lock-spring; spring the safety-lock over the stop $a^7$; turn to a vertical position and withdraw; turn the shoulder-piece locking-pin $J^4$ through one hundred and eighty degrees and withdraw; remove the shoulder-piece; withdraw the mainspring; pull out the pistol-grip to the rear and remove; swing the trigger to its extreme rearward position and remove it and its spring; pull the cocking-handle to the rear, when it will drop out; pull out the piston and with it the breech-block; turn the locking-dog until at right angles to the breech-block and press on hooks of extractor, when the latter will spring out of place; give a half-turn to nose-piece and withdraw; drop out firing-pin; swing out ejector and remove; withdraw the barrel-locking key $B^3$ and screw out cylinder and barrel; mount in reverse order.

In order to regulate the rate of fire of the gun, we provide a valve which controls the point at which the exhaust of the powder-gas is applied in the cylinder C, thereby regulating the violence with which the piston is thrown to the rear, and consequently the rate of fire.

In Figs. 56 to 59 we show one form of valve for regulating size of exhaust-port, as well as its distance from the inlet-port, which consists of a simple sleeve X slipped over the cylinder C and provided with a port $x$, corresponding to the exhaust-port $C^2$. By suitable means, such as the milled head X′, this sleeve may either be moved longitudinally along the cylinder or revolved around it, thereby varying the area of the exhaust-port and its distance from the inlet-canal. Graduations corresponding to the resulting rates of fire may be provided for this device.

We do not limit ourselves to any particular form or construction of valve, the essence of this part of our invention consisting in controlling the point in the expansion of the gas in the gas-chamber at which the exhaust takes place by regulating the distance between the cylinder inlet and exhaust ports by any suitable device.

While we have shown the extractor as divided in order to lie in the narrow grooves in the funnel-shaped extension $B^4$ of the barrel, it is obvious that the cartridge-lip and lug of the breech-bolt may be divided in the same manner, the essence of this part of our invention consisting in making the grooves within the funnel of such width that it will be impossible for the bullet to jam therein and in providing the funnel to guide the cartridge into the chamber, however badly the cartridge may be presented.

In Figs. 5 and 6 we have shown one way of securing the barrel and cylinder to the receiver A. In Figs. 60 to 63 we show another and preferable way of locking the barrel and cylinder in place by replacing the screw-threads on the barrel B and cylinder C with longitudinal cylinder and barrel splines $z$ $z'$, which register with longitudinal grooves $z^4$ $z^5$ in the collar B′ and receiver, respectively, and by substituting for the key a wedge $z^8$. By this arrangement barrel and cylinder may be slipped longitudinally into place and secured by the wedge.

In place of the elastic cartridge-strip S, (shown in Figs. 64 to 66,) we may employ a flexible band, as shown in Figs. 67 to 69, which consists of a series of links T, jointed together by hooks and eyes $t$ $t'$, formed in the links. Each link has formed upon it the clips $t^2$ and $t^3$, which hold the cartridge at the neck and near the head, respectively, and the bearing $t^4$ $t^4$, which prevents the cartridge from being withdrawn to the rear. The clip $t^3$ is rounded at $t^5$ to raise the head of the cartridge when it is forced into the chamber by the breech-block. The bearings T′ are formed to engage with the teeth of the feed-wheel $P^5$ and are spaced to the pitch of this latter. The tongue $t^6$ is formed on the first clip of each band to facilitate the introduction of the latter into the feed.

It is evident that many features of our invention are capable of employment and can be used in guns of different construction and mode of operation from the gun shown in our drawings, neither do we limit ourselves to their use in such combination alone; but

What we claim as new, and desire to secure by Letters Patent, is—

1. In a breech-loading gun, the combination with the gun, the receiver, and the breech-bolt, of a reciprocating rod located within the receiver, means on the rod to engage with the breech-bolt, a coiled motor-spring located within the receiver in a longitudinal chamber substantially as described parallel and collateral with the rod having an abutment in the rear of said chamber and in continuous engagement with said rod and means for withdrawing the rod against the stress of the spring, substantially as described.

2. In a breech-loading gun, the combination with the gun, the receiver and the breech-bolt, of a reciprocating rod located within the receiver means on the rod to engage the breech-bolt, a coiled motor-spring located within the receiver in a longitudinal chamber substantially as described parallel and collateral with the rod and abutting against the rear of said chamber, an abutment on the rod for the forward end of said spring, and a cocking device on said rod having a finger-grip passing through a slot in the bottom of the receiver, substantially as and for the purpose described.

3. In a breech-loading gun, the combination with the gun, the receiver, the breech-bolt, a reciprocating rod located within the receiver and means on the rod to engage the breech-bolt, of a coiled motor-spring located within the receiver in a chamber parallel with the rod and having a rear abutment therein, an abutment on the rod in the path of the forward end of said spring, a detachable cocking device between said abutment and spring and having a seat forming a bearing for the forward end of said spring, whereby the cocking device is held in engagement with the abutment, a finger-grip on said cocking device and a slot in the bottom of said receiver through which said finger-grip projects, substantially as described and for the purpose stated.

4. In a breech-loading gun the combination with the gun, the receiver, the breech-bolt, a reciprocating rod located within the receiver and means on the rod to engage the breech-bolt, of a coiled motor-spring located within the receiver in a chamber parallel with the rod and having a removable rear abutment secured to the receiver by a removable pin, an abutment on the rod in the path of the forward end of said spring, a detachable cocking device between said abutment and spring having a seat forming a bearing for the forward end of said spring, whereby the cocking device is held in engagement with said abutment, a finger-grip on said cocking device, and a slot of varying width in the bottom of said receiver, through which said finger-grip projects, and through the rear part of which the cocking device may be dismounted, when the spring is withdrawn, substantially as described and for the purpose stated.

5. In a breech-loading gun, the combination with the receiver A having the finger-grip slot $A^3$ of unequal width of the rod D having the recess $d^3$ and the tang $D^4$, the cocking device F, having the key $f'$, the hooks $f^2, f^3$, the slot-guides $f^4$, the mainspring-seat $f^5$, and the finger-grip $f$, the mainspring E, the mainspring rear abutment $J'$ secured to the receiver by the locking-pin $J^4$, and the finger-grip guard $A^4$, substantially as described and for the purpose stated.

6. In a breech-loading gun, the combination with the gun, the receiver, the breech-bolt, a reciprocating rod located in the receiver, means on the rod to engage the breech-bolt, and means for imparting a reciprocating movement to the rod, of a sear on the rod, a trigger having upper rearward-extending pivot-bearings and a front face curved concentric with said bearings mounted in a chamber in the receiver having an upper rearward seat for said trigger-bearings, a forward curve concentric with said bearings, and a rearward and downward extension from said bearings, and a trigger-spring interposed between the rear of said trigger and the receiver, substantially as described.

7. In a breech-loading gun, the combination with the gun, the receiver, the breech-bolt, a reciprocating rod located within the receiver, means on the rod to engage the breech-bolt, and a coiled motor-spring located within a chamber in the receiver parallel and in continuous engagement with the rod, of a sear on the rod, and a trigger mounted in the receiver which registers with and engages with the sear in a predetermined position of the rod, and having a central aperture through which passes the mainspring, substantially as described.

8. In a breech-loading gun, the combination with the gun, the receiver, the breech-bolt, a reciprocating rod located within the receiver, means on the rod to engage the breech-bolt, and a coiled motor-spring located within a chamber in the receiver parallel and in continuous engagement with the rod, of a sear on the rod, a trigger shaped and pivoted as described mounted in a chamber in the receiver shaped as described and having a central aperture through which passes the mainspring, and a trigger-spring interposed between the rear of said trigger and the receiver, substantially as described and for the purpose stated.

9. In a breech-loading gun, the combination with the receiver A having the trigger-recess $D^5$ shaped as described, of the rod D having the guide-groove $D^6$, the removable sear G having the cocking-notch $G'$ bearings $g$ and flattened axles $g'$ seated in the recesses $d^4\ d^5$ of the rod D, the trigger H shaped as described and having the cocking-lug H', the bearings $h^2$, the trigger-spring seat $h^4$ and the trigger finger-piece $h$, the pistol-grip I, hooking on the receiver, the trigger-spring stud $i$ on the pistol-grip, the trigger-spring $G^2$ between the trigger and the pistol-grip, the mainspring rear abutment J' secured to the receiver by the locking-pin $J^4$ and holding the pistol-grip in place and the mainspring E passing through the aperture $h'$ in the trigger and located between the bearing $D^4$ on the rod D and the rear abutment J', substantially as described.

10. In a breech-loading gun the combination of the receiver A having the finger-grip slot $A^3$ of unequal width and the trigger-recess $D^5$, the rod D having the trigger guide-groove $D^8$, the tang $D^4$ on the rod D, the removable sear G having the cocking-notch G' and seated in the rod D, the cocking device F engaging with the tang $D^4$ and the rod D and having the mainspring-seat $f^5$ as described and having the finger-grip $f$ projecting through the slot $A^3$, the trigger H having the cocking-lug H', the mainspring-aperture $h'$, trigger-spring seat $h^4$ and trigger finger-piece $h$, said trigger seated in the recess $D^5$ as described, the pistol-grip I hooking on to the receiver and having the trigger-spring stud $i$, the trigger-spring $G^2$ between the trigger and the pistol-grip, the mainspring rear abutment J' secured to the receiver by the locking-pin $J^4$ and holding the pistol-grip in place, the mainspring E passing through the aperture $h'$ in the trigger and located between the cocking device F and the rear abutment J', and the finger-grip guard $A^4$, substantially as described and for the purpose stated.

11. In a breech-loading gun the combination with the gun, the receiver open at its rear and having the ears $A^{10}$, the breech-bolt, means for reciprocating the breech-bolt, and a trigger having a finger-piece, of the pistol-grip I having a slot through which projects the trigger finger-piece and which engages and closes the bottom of the receiver, and the housing consisting of the shoulder-piece J having the abutment J' which closes the rear of the receiver, the cover $J^3$ which engages and closes the top of the receiver, and the shoulder-piece proper $J^2$, and the locking-pin $J^4$ which secures the housing to the receiver, substantially as described.

12. In a breech-loading gun the combination with the gun-breech and the breech-block, of an extractor having a bifurcated end which enters corresponding recesses in the gun-breech, substantially as described.

13. In a breech-loading gun the combination with the gun-breech and the breech-block, of an extractor having a bifurcated end which enters corresponding recesses in the gun-breech, a seat in the breech-block to receive the ejector, and means to secure the ejector in its seat, substantially as described.

14. In a breech-loading gun the combination with the gun-breech and the breech-block having the locking-grooves $l^2\ l^3\ l^3$, of the removable nose-piece $L^2$ having the firing-pin passage $l^4$, the cartridge lip and lug $l^5\ l^6$ which enter corresponding seats in the gun-breech, and the lugs $l'\ l'$ on its stem which engage the grooves $l^2\ l^3$ in the counterbore of the breech-block, substantially as described.

15. In a breech-loading gun the combination with the gun-breech, of the breech-block L having the locking-grooves $l^2\ l^3\ l^3$, extractor-seat $l^{16}$ and extractor-hook seats $l^{18}$, the removable nose-piece $L^2$ having the firing-pin passage $l^4$, the cartridge lip and lug $l^5\ l^6$ which enter corresponding seats in the gun-breech, the extractor-seat $l^{17}$, and the lugs $l'\ l'$ on its stem which engage the grooves $l^2\ l^3$ in the counterbore of the breech-block, the bifurcated extractor N having the locking-hooks $n'\ n'$ which engage the hook-seats $l^{18}$ in the breech-block, and the locking-dog $L^3$ pivoted to the rear of the breech-block and having the recess $l^{19}$ which registers with the end of the extractor-shank when the breech-block is removed and the dog turned down, substantially as described.

16. In a breech-loading gun the combination with the receiver having the ejector-housing $A^6$ open at $a^{12}$ for the insertion of the ejector and provided with the trunnion-bearing $a^{13}$ and slotted passage-way $a^{14}$ thereto for the trunnions of the ejector, the ejector O having the trunnions $o$, the toe $o^2$ and the arm O' carrying the inner lug $o'$ and the outer lug $o^3$, and the breech-block having the guide-groove $l^{20}\ l^{21}$ which engages the ejector-lug $o'$ and the ejector-slot $l^7$ in its nose, substantially as and for the purpose set forth.

17. In a breech-loading gun the combination with the gun, the receiver having a cartridge-feed-box chamber and the breech-bolt, of a detachable cartridge-feed box, cartridge-feed mechanism contained therein, means on the feed-box for engaging with the feed-box chamber in the receiver, means for securing the feed-box to the receiver, and means in the receiver to actuate the feed mechanism and the breech-bolt, substantially as described.

18. In a breech-loading gun, the combination with the gun, the receiver having a cartridge-feed-box chamber, a cartridge-feed box containing feed mechanism, a reciprocating rod located within the receiver, means on the rod to operate the feed mechanism in the feed-box and means to reciprocate the rod, substantially as described.

19. In a cartridge-feed box having the guide-table P slotted at $p^5$ for the feed-wheel, the shaft $P^4$ mounted in bearings in the box below the table and having the collar $p^{11}$, the sleeve $p^3$ mounted freely on the shaft and carrying the feed-wheel $P^5$ and the cam-pinion $P^6$ which rotate with the sleeve, of the ratchet $P^8$ on the cam-pinion $P^6$, the pawl-arm $P^7$ secured to the head of the shaft, the pawl $p^6$ secured to the arm $P^7$ and engaging with the ratchet $P^8$ on the cam-pinion $P^6$, and the pawl-spring $P^9$ located between the shaft-collar $p^{11}$ and bearings in the box, substantially as described.

20. In a cartridge-feed box, the combination of the shaft mounted therein and having the neck $p^7$, the freely-rotating sleeve mounted thereon and the feed-wheel and cam-pinion, a ratchet on the sleeve and a pawl-arm carrying a pawl which engages with the ratchet of the pawl-arm having a bore on one side of the diameter of the neck of the shaft and on the other a concentric counterbore of the diameter of the head of the shaft, and an entrance-slot to said bore of the width of the neck of the shaft substantially as described.

21. In a breech-loading gun, the combination with the gun, the receiver having a cartridge-feed-box chamber, a reciprocating rod located in the receiver and means for reciprocating the rod, of a cartridge-feed box, means on the feed-box for engaging with the feed-box chamber in the receiver, a feed-wheel and cam-pinion $P^6$ mounted in the box, suitable connections between the feed-wheel and the cam-pinion, a longitudinal and pointed cam Q on the rod which engages with the cam-pinion $P^6$ in the course of the traverse of the rod to revolve and steady the pinion, and a deflecting-cam $Q'$ on the rod which also engages the pinion to revolve it, substantially as described and for the purpose stated.

22. In a breech-loading gun, the combination with the gun, of the receiver A having a chamber in the rear of the gun-breech to receive a cartridge-feed box, the breech-block L, the rod D located in the receiver and having the longitudinal cam Q pointed at each end and the deflecting-cam $Q'$, means on the rod to engage with the breech-block, the mainspring E located in the receiver in a chamber parallel with the rod D and in perpetual engagement therewith, the feed-box P, consisting of the slotted feed-table $P^2$ having the guides $p$ $p$ which engage in mortises $p'$ in the receiver-chamber and the case $P'$, the feed-strip grooves $p^{15}$, cartridge and head guides $p^{16}$ $p^{17}$ and inclined guide $p^{19}$, the shaft $P^4$ mounted in bearings in the box having the collar $p^{11}$ and abutting in recesses in the receiver, the sleeve $p^3$ mounted on the shaft and carrying the feed-wheel $P^5$, the pinion $P^6$ also mounted on the sleeve and projecting into the path of the cams $Q'$ and Q on the rod, the ratchet $P^8$ on the cam-pinion $P^6$, the pawl-arm $P^7$ carrying the pawl $p^6$ and secured to the head of the shaft $P^4$ as described, the pawl-spring $P^9$ located between the shaft-collar and bearing in the case, the cartridge-tongue $A^7$ and cartridge-abutment $A^8$ both located in the receiver above the feed-table and means for withdrawing the rod D against the stress of the mainspring, substantially as described.

23. In a breech-loading gun, the combination with the gun, the receiver, the breech-bolt, means to reciprocate the bolt and a cartridge-strip-feeding device, of a locking device adapted to be automatically actuated upon the exhaustion of the feed-strip to lock the bolt when open, substantially as described.

24. In a breech-loading gun the combination with the gun, the receiver, the breech-bolt, a reciprocating rod, a lug on the rod, means on the rod to engage the breech-bolt, and means to reciprocate the rod, of a cartridge-feed box having a feed-table slotted in the path of the feed-strip, a shaft mounted in the box, a lever pivoted on the shaft consisting of an upper arm normally projecting through the slot and a lower arm carrying a lug normally in engagement with the lug on the rod, a spring interposed between the lower arm and the box which holds the lever in its normal position, substantially as described.

25. In a breech-loading gun the combination with the gun, the receiver, the breech-bolt, and a removable feed-box containing the cartridge-strip-feeding mechanism, of a lock mounted in the feed-box adapted to automatically lock the breech-bolt upon the exhaustion of the feed-strip when the breech is open substantially as described.

26. In a breech-loading gun, the combination with the gun, the receiver, the breech-bolt, the reciprocating rod, means on the rod to engage the breech-bolt, and means to reciprocate the rod, of a safety-lock and means to bring said safety-lock into the path of the rod when the breech is closed, substantially as described.

27. In a breech-loading gun, the combination with the gun, the receiver, the breech-bolt, the reciprocating rod, means on the rod to engage the breech-bolt and means to reciprocate the rod, of a safety-lock and means to engage the safety-lock with the rod when the breech is opened substantially as described.

28. In a breech-loading gun of the class described the combination with the receiver A, having the recesses $a^5$ $a^6$ and the stops $a^7$ $a^7$, of the rod D having the locking-recess $d^{11}$ and its under part cut away rearward at $d^{10}$ and the safety-lock K mounted in the receiver in the path of the rod and consisting of the slotted shaft $K'$ having the shaft-stud $k^2$, the handle $K^2$, the button $K^3$ and the stud $k$, substantially as described.

29. In a breech-loading gun in which the loading and firing mechanism is controlled by the expansive power of the gases developed during the combustion of the explosive, the combination with the gun and the gas-chamber, having an inlet-port and an exhaust-port, of means for varying the distance between the inlet and exhaust ports of the cylinder, substantially as described.

30. In a breech-loading gun in which the loading and firing mechanism is controlled by the expansive power of the gases developed during the combustion of the explosive, the combination with the gun and the gas-chamber having an inlet and exhaust port, of means for varying the distance between the inlet and exhaust ports of the gas-chamber and for also varying the size of the exhaust-port, substantially as described.

31. In a breech-loading gun in which the loading and firing mechanism is controlled by the expansive power of the gases developed during the combustion of the explosive, the combination with the cylinder having an exhaust-port of a valve substantially as described.

32. In a breech-loading gun in which the loading and firing mechanism is controlled by the expansive power of the gases developed during the combustion of the explosive, the combination with the cylinder having an inlet and exhaust port, of the sleeve X mounted on the cylinder over the exhaust-port, substantially as described.

33. In a breech-loading gun the combination with the gun and the cartridge-feed mechanism, of a feed-strip having a cam-shaped clip which both holds the cartridge to the strip and guides it into the loading position, substantially as described.

34. In a breech-loading gun the combination with the gun and cartridge-feed mechanism, of a receiver having a cartridge-abutment in the feed-chamber recess, and a feed-strip having a clip which both holds the cartridge to the strip and forms a guide in conjunction with the cartridge-abutment in the receiver to direct the cartridge into the cartridge-chamber in the gun-barrel, substantially as described.

35. In a breech-loading gun, the combination with the gun, a cartridge-feeding device, a breech-bolt, mechanism which operates both the feed mechanism and the breech-bolt, a lock which locks the operating mechanism when the breech is open, of a feed-strip which disengages said lock when inserted and frees it when exhausted, substantially as described.

36. In a breech-loading gun the combination with the gun having a cartridge-feed mechanism as described, of a feed-strip having a forward abutment which throws said feed mechanism into engagement with said strip, substantially as described.

37. The feed-strip S adapted to engage the feed mechanism as described, and having the abutment $s^7$, the longitudinal stiffening-ribs $s$, the cam-openings $S'$, the cartridge-body clips $s'$, $s^2$ the rounded-bearing cartridge-clip $s^3$, the cartridge-head stop $s^4$ and the cut-away portion $s^6$, substantially as described and for the purpose stated.

38. In a breech-loading gun the combination with the gun-barrel a breech-bolt and a fork-headed extractor, of a chamber in the barrel having a funnel-shaped extension recessed to receive the extractor, and the head of the breech-bolt, substantially as described.

39. In a breech-loading gun, the combination with the gun-barrel the breech-bolt and an extractor, of a chamber in the barrel having a funnel-shaped extension provided with recesses to receive the extractor and bolt-head and having ribs dividing said recesses longitudinally which serve as guides for the bullets, substantially as described.

40. In a breech-loading gun the combination with the gun-barrel the breech-bolt and an extractor, of a chamber in the barrel havin a funnel-shaped extension having recesses to receive the extractor and bolt-head said recesses being of less width than the diameter of the point of the bullet, substantially as and for the purpose set forth.

41. In a breech-loading gun of the class described, the combination of the gun-barrel having the splines $z'$, the cylinder having the splines $z$, the collar having the grooves $z^4$, the receiver having the grooves $z^5$, and keyway and the wedge $z^8$, substantially as described.

In testimony whereof we have hereunto signed this specification in the presence of witnesses.

LAURENCE V. BENÉT.
HENRI A. MERCIÉ.

Witnesses for Laurence V. Benét:
A. C. HOERNER,
CHARLES KURER.

Witnesses for Henri A. Mercié:
E. DE MORAINVILLE,
MARIUS LEFRANÇOIS.